(12) United States Patent
Lang et al.

(10) Patent No.: US 10,965,734 B2
(45) Date of Patent: Mar. 30, 2021

(54) DATA MANAGEMENT FOR AN APPLICATION WITH MULTIPLE OPERATION MODES

(71) Applicant: Citrix Systems, Inc., Fort Lauderdale, FL (US)

(72) Inventors: Zhongmin Lang, Parkland, FL (US); Gary Barton, Boca Raton, FL (US); Nitin Desai, Coral Springs, FL (US); James R. Walker, Deerfield Beach, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/295,273

(22) Filed: Mar. 7, 2019

(65) Prior Publication Data
US 2019/0208003 A1    Jul. 4, 2019

Related U.S. Application Data

(63) Continuation of application No. 14/021,227, filed on Sep. 9, 2013, now Pat. No. 10,284,627, which is a
(Continued)

(51) Int. Cl.
*H04L 29/08* (2006.01)
*G06F 9/46* (2006.01)
(Continued)

(52) U.S. Cl.
CPC .............. *H04L 67/10* (2013.01); *G06F 9/468* (2013.01); *G06F 21/51* (2013.01); *H04L 63/105* (2013.01);
(Continued)

(58) Field of Classification Search
CPC ....... H04L 67/10; H04L 63/20; H04L 63/105; H04W 12/08; G06F 21/51
See application file for complete search history.

(56) References Cited

U.S. PATENT DOCUMENTS

| 5,369,702 A | 11/1994 | Shanton |
| 5,805,803 A | 9/1998 | Birrell et al. |

(Continued)

FOREIGN PATENT DOCUMENTS

| CN | 1313690 A | 9/2001 |
| CN | 1613040 A | 5/2005 |

(Continued)

OTHER PUBLICATIONS

Jun. 7, 2016—U.S. Notice of Allowance—U.S. Appl. No. 14/242,011.
(Continued)

*Primary Examiner* — Austin J Moreau
(74) *Attorney, Agent, or Firm* — Banner & Witcoff, Ltd.

(57) ABSTRACT

A method and system for managing an application with multiple modes are described. A device manager that manages a mobile device may monitor the mobile device. The device manager may detect that a first type of application that runs in a managed mode (or in multiple managed modes) and an unmanaged mode is installed on the mobile device. When the application is executed on the device, the application executes in accordance with the selected application mode, e.g., based on location, user, role, industry presence, or other predefined context.

18 Claims, 14 Drawing Sheets

Related U.S. Application Data continuation-in-part of application No. 13/886,889, filed on May 3, 2013, now Pat. No. 9,280,377.

(60) Provisional application No. 61/861,736, filed on Aug. 2, 2013, provisional application No. 61/861,758, filed on Aug. 2, 2013, provisional application No. 61/806,577, filed on Mar. 29, 2013.

(51) Int. Cl.

| | | |
|---|---|---|
| *G06F 21/51* | (2013.01) | |
| *H04L 29/06* | (2006.01) | |
| *H04W 12/08* | (2009.01) | |
| *H04W 12/00* | (2009.01) | |
| *H04W 12/02* | (2009.01) | |

(52) U.S. Cl.
CPC ......... *H04L 63/20* (2013.01); *H04W 12/0027* (2019.01); *H04W 12/08* (2013.01); *H04W 12/02* (2013.01)

(56) References Cited

U.S. PATENT DOCUMENTS

| | | |
|---|---|---|
| 6,151,606 A | 11/2000 | Mendez |
| 6,154,172 A | 11/2000 | Piccionelli et al. |
| 6,314,409 B2 | 11/2001 | Schneck et al. |
| 6,480,096 B1 | 11/2002 | Gutman et al. |
| 6,609,198 B1 | 8/2003 | Wood et al. |
| 6,621,766 B2 | 9/2003 | Brewer et al. |
| 6,751,738 B2 | 6/2004 | Wesinger, Jr. et al. |
| 6,859,879 B2 | 2/2005 | Henn et al. |
| 6,883,098 B1 | 4/2005 | Roman et al. |
| 6,901,588 B1 | 5/2005 | Krapf et al. |
| 6,987,906 B2 | 1/2006 | Nakama et al. |
| 7,043,453 B2 | 5/2006 | Stefik et al. |
| 7,065,652 B1 | 6/2006 | Xu et al. |
| 7,103,915 B2 | 9/2006 | Redlich et al. |
| 7,110,629 B2 | 9/2006 | Bjorkman et al. |
| 7,159,120 B2 | 1/2007 | Muratov et al. |
| 7,240,015 B1 | 7/2007 | Karmouch et al. |
| 7,254,831 B2 | 8/2007 | Saunders et al. |
| 7,263,256 B2 | 8/2007 | Kim et al. |
| 7,269,605 B1 | 9/2007 | Nguyen et al. |
| 7,340,772 B2 | 3/2008 | Panasyuk et al. |
| 7,349,913 B2 | 3/2008 | Clark et al. |
| 7,350,085 B2 | 3/2008 | Johnson et al. |
| 7,415,498 B2 | 8/2008 | Russo et al. |
| 7,437,752 B2 | 10/2008 | Heard et al. |
| 7,437,755 B2 | 10/2008 | Farino et al. |
| 7,454,102 B2 | 11/2008 | Keyser et al. |
| 7,490,073 B1 | 2/2009 | Qureshi et al. |
| 7,490,352 B2 | 2/2009 | Kramer et al. |
| 7,496,954 B1 | 2/2009 | Himawan et al. |
| 7,502,861 B1 | 3/2009 | Protassov et al. |
| 7,509,672 B1 | 3/2009 | Horwitz et al. |
| 7,515,717 B2 | 4/2009 | Doyle et al. |
| 7,526,170 B2 | 4/2009 | Kishima |
| 7,526,800 B2 | 4/2009 | Wright et al. |
| 7,529,923 B2 | 5/2009 | Chartrand et al. |
| 7,574,090 B2 | 8/2009 | Shimooka |
| 7,590,684 B2 | 9/2009 | Herrmann |
| 7,596,593 B2 | 9/2009 | Mitchell et al. |
| 7,599,991 B2 | 10/2009 | Vargas et al. |
| 7,623,846 B2 | 11/2009 | Hybre et al. |
| 7,631,297 B2 | 12/2009 | Childress et al. |
| 7,644,377 B1 | 1/2010 | Saxe et al. |
| 7,665,125 B2 | 2/2010 | Heard et al. |
| 7,697,737 B2 | 4/2010 | Aull et al. |
| 7,716,240 B2 | 5/2010 | Lim |
| 7,743,260 B2 | 6/2010 | Fetik |
| 7,761,523 B2 | 7/2010 | May et al. |
| 7,765,374 B2 | 7/2010 | Field et al. |
| 7,774,323 B2 | 8/2010 | Helfman |
| 7,779,408 B1 | 8/2010 | Papineau |
| 7,779,458 B1 | 8/2010 | Heiderscheit et al. |
| 7,788,535 B2 | 8/2010 | Bussa et al. |
| 7,788,536 B1 | 8/2010 | Qureshi et al. |
| 7,793,333 B2 | 9/2010 | Goh et al. |
| 7,865,888 B1 | 1/2011 | Qureshi et al. |
| 7,890,612 B2 | 2/2011 | Todd et al. |
| 7,904,468 B2 | 3/2011 | Neil et al. |
| 7,921,182 B2 | 4/2011 | Hamasaki, Jr. et al. |
| 7,921,303 B2 | 4/2011 | Mauro, II |
| 7,945,788 B2 | 5/2011 | Roberts et al. |
| 7,950,066 B1 | 5/2011 | Zuili |
| 7,966,323 B2 | 6/2011 | Bocking et al. |
| 7,966,652 B2 | 6/2011 | Ganesan |
| 7,970,386 B2 | 6/2011 | Bhat et al. |
| 7,970,923 B2 | 6/2011 | Pedersen et al. |
| 8,001,278 B2 | 8/2011 | Huggahalli et al. |
| 8,012,219 B2 | 9/2011 | Mendez et al. |
| 8,020,192 B2 | 9/2011 | Wright et al. |
| 8,037,421 B2 | 10/2011 | Scott et al. |
| 8,037,453 B1 | 10/2011 | Zawadzki |
| 8,051,180 B2 | 11/2011 | Mazzaferri et al. |
| 8,060,074 B2 | 11/2011 | Danford et al. |
| 8,060,596 B1 | 11/2011 | Wootton et al. |
| 8,078,713 B1 | 12/2011 | Kim |
| 8,085,891 B2 | 12/2011 | Owen |
| 8,087,062 B2 | 12/2011 | Koeda |
| 8,095,517 B2 | 1/2012 | Sandoval et al. |
| 8,095,786 B1 | 1/2012 | Kshirsagar et al. |
| 8,103,765 B2 | 1/2012 | Greifeneder et al. |
| 8,108,456 B2 | 1/2012 | Chen et al. |
| 8,112,601 B2 | 2/2012 | Al-Azzawi |
| 8,117,589 B2 | 2/2012 | Christensen et al. |
| 8,126,128 B1 | 2/2012 | Hicks, III et al. |
| 8,126,506 B2 | 2/2012 | Roundtree |
| 8,132,242 B1 | 3/2012 | Wu |
| 8,179,886 B2 | 5/2012 | Hume et al. |
| 8,181,010 B1 | 5/2012 | Uchil et al. |
| 8,199,507 B2 | 6/2012 | Shohet et al. |
| 8,200,626 B1 | 6/2012 | Katzer et al. |
| 8,214,887 B2 | 7/2012 | Clark et al. |
| 8,233,882 B2 | 7/2012 | Rogel |
| 8,237,068 B2 | 8/2012 | Szaikowski |
| 8,238,256 B2 | 8/2012 | Nugent |
| 8,239,918 B1 | 8/2012 | Cohen |
| 8,245,285 B1 | 8/2012 | Ravishankar et al. |
| 8,259,705 B2 | 9/2012 | Hume |
| 8,261,231 B1 | 9/2012 | Hirsch et al. |
| 8,272,030 B1 | 9/2012 | Annan et al. |
| 8,285,681 B2 | 10/2012 | Prahlad et al. |
| 8,296,239 B2 | 10/2012 | Nonaka |
| 8,296,821 B2 | 10/2012 | Nakae |
| 8,321,953 B2 | 11/2012 | Jevans |
| 8,332,464 B2 | 12/2012 | Dispensa et al. |
| 8,359,016 B2 | 1/2013 | Lindeman et al. |
| 8,365,258 B2 | 1/2013 | Dispensa |
| 8,365,266 B2 | 1/2013 | Bogner |
| 8,387,110 B1 | 2/2013 | Cooper |
| 8,402,011 B1 | 3/2013 | Bodenhamer |
| 8,406,748 B2 | 3/2013 | Raleigh et al. |
| 8,418,238 B2 | 4/2013 | Platt et al. |
| 8,443,456 B2 | 5/2013 | van der Linden |
| 8,463,128 B2 | 6/2013 | Perret-Gentil |
| 8,463,253 B2 | 6/2013 | Chipalkatti et al. |
| 8,463,946 B2 | 6/2013 | Ferguson et al. |
| 8,468,090 B2 | 6/2013 | Lesandro et al. |
| 8,468,455 B2 | 6/2013 | Jorgensen et al. |
| 8,489,685 B2 | 7/2013 | Bharadhwaj et al. |
| 8,495,746 B2 | 7/2013 | Fissel et al. |
| 8,528,059 B1 | 9/2013 | Labana et al. |
| 8,549,656 B2 | 10/2013 | Blaisdell et al. |
| 8,560,709 B1 | 10/2013 | Shokhor et al. |
| 8,578,443 B2 | 11/2013 | Narain et al. |
| 8,584,114 B2 | 11/2013 | Rabinovich et al. |
| 8,601,562 B2 | 12/2013 | Milas |
| 8,612,582 B2 | 12/2013 | Dare et al. |
| 8,612,947 B2 | 12/2013 | LeRoux et al. |
| 8,613,070 B1 | 12/2013 | Borzycki et al. |
| 8,615,581 B2 | 12/2013 | Dare et al. |
| 8,621,620 B2 | 12/2013 | Sallam |

(56) References Cited

U.S. PATENT DOCUMENTS

| | | |
|---|---|---|
| 8,650,290 B2 | 2/2014 | Dare et al. |
| 8,650,303 B1 | 2/2014 | Lang et al. |
| 8,650,620 B2 | 2/2014 | Chawla et al. |
| 8,660,530 B2 | 2/2014 | Sharp et al. |
| 8,676,183 B2 | 3/2014 | Sesto |
| 8,687,814 B2 | 4/2014 | Nord et al. |
| 8,688,583 B2 | 4/2014 | Boccon-Gibod et al. |
| 8,695,060 B2 | 4/2014 | Wade et al. |
| 8,713,633 B2 | 4/2014 | Thomas |
| 8,719,898 B1 | 5/2014 | Barton et al. |
| 8,745,213 B2 | 6/2014 | Dare et al. |
| 8,756,311 B2 | 6/2014 | Dare et al. |
| 8,788,655 B2 | 7/2014 | Dare et al. |
| 8,793,758 B2 | 7/2014 | Raleigh et al. |
| 8,799,994 B2 | 8/2014 | Barton et al. |
| 8,806,570 B2 | 8/2014 | Barton et al. |
| 8,819,772 B2 | 8/2014 | Bettini et al. |
| 8,825,863 B2 | 9/2014 | Hansson et al. |
| 8,843,734 B2 | 9/2014 | Lim |
| 8,849,348 B2 | 9/2014 | Xiao et al. |
| 8,850,010 B1 | 9/2014 | Qureshi |
| 8,850,049 B1 | 9/2014 | Qureshi |
| 8,850,177 B2 | 9/2014 | Brown et al. |
| 8,850,423 B2 | 9/2014 | Barkie et al. |
| 8,850,434 B1 | 9/2014 | Butikofer et al. |
| 8,856,322 B2 | 10/2014 | Dare et al. |
| 8,856,909 B1 | 10/2014 | Chickering |
| 8,856,950 B2 | 10/2014 | Kim et al. |
| 8,863,297 B2 | 10/2014 | Sharma et al. |
| 8,863,298 B2 | 10/2014 | Akella et al. |
| 8,863,299 B2 | 10/2014 | Sharma et al. |
| 8,868,901 B2 | 10/2014 | Kim et al. |
| 8,869,235 B2 | 10/2014 | Qureshi et al. |
| 8,869,262 B2 | 10/2014 | Mullick et al. |
| 8,881,228 B2 | 11/2014 | Qureshi |
| 8,881,229 B2 | 11/2014 | Barton et al. |
| 8,885,096 B2 | 11/2014 | Vakil |
| 8,918,834 B1 | 12/2014 | Samuelsson |
| 8,931,038 B2 | 1/2015 | Pulier et al. |
| 8,931,042 B1 | 1/2015 | Weiss |
| 8,949,929 B2 | 2/2015 | Kelly et al. |
| 8,972,980 B2 | 3/2015 | Banga et al. |
| 9,003,387 B2 | 4/2015 | Van Camp et al. |
| 9,043,242 B2 | 5/2015 | Kuriya et al. |
| 9,077,796 B2 | 7/2015 | Gittleman et al. |
| 9,098,715 B1 | 8/2015 | Spear, Jr. et al. |
| 9,135,418 B2 | 9/2015 | Wade et al. |
| 9,143,943 B2 | 9/2015 | Draluk et al. |
| 9,165,139 B2 | 10/2015 | Wade et al. |
| 9,171,139 B2 | 10/2015 | Newell |
| 9,178,981 B2 | 11/2015 | Cho et al. |
| 9,183,380 B2 | 11/2015 | Qureshi et al. |
| 9,197,672 B2 | 11/2015 | Dobson et al. |
| 9,213,850 B2 | 12/2015 | Barton et al. |
| 9,256,758 B2 | 2/2016 | Draluk et al. |
| 9,280,377 B2 | 3/2016 | Lang et al. |
| 9,311,509 B2 | 4/2016 | Casper et al. |
| 9,355,253 B2 | 5/2016 | Kellerman et al. |
| 9,356,895 B2 | 5/2016 | Chiu |
| 9,367,692 B2 | 6/2016 | Brown et al. |
| 9,509,592 B2 | 11/2016 | Draluk et al. |
| 9,521,147 B2 | 12/2016 | Barton et al. |
| 9,577,985 B2 | 2/2017 | Deasy et al. |
| 9,659,169 B2 | 5/2017 | Weiss |
| 9,712,530 B2 | 7/2017 | White et al. |
| 9,716,689 B2 | 7/2017 | Andress et al. |
| 9,753,746 B2 | 9/2017 | Krzyzanowski et al. |
| 9,754,092 B2 | 9/2017 | Newell |
| 9,772,875 B2 | 9/2017 | Draluk et al. |
| 9,779,250 B1 | 10/2017 | Hui et al. |
| 9,781,594 B2 | 10/2017 | Hailpern |
| 9,971,585 B2 | 5/2018 | Walker et al. |
| 9,973,489 B2 | 5/2018 | Barton et al. |
| 10,044,757 B2 | 8/2018 | Qureshi et al. |
| 10,402,546 B1 | 9/2019 | Qureshi et al. |
| 10,469,534 B2 | 11/2019 | Qureshi et al. |
| 10,476,885 B2 | 11/2019 | Lang et al. |
| 2001/0027383 A1 | 10/2001 | Maliszewski |
| 2001/0042045 A1 | 11/2001 | Howard et al. |
| 2002/0112047 A1 | 8/2002 | Kushwaha et al. |
| 2002/0120607 A1 | 8/2002 | Price et al. |
| 2002/0180790 A1 | 12/2002 | Broussard |
| 2003/0031319 A1 | 2/2003 | Abe et al. |
| 2003/0037103 A1 | 2/2003 | Salmi et al. |
| 2003/0046366 A1 | 3/2003 | Pardikar et al. |
| 2003/0065947 A1 | 4/2003 | Song et al. |
| 2003/0083954 A1 | 5/2003 | Namba |
| 2003/0103075 A1 | 6/2003 | Rosselot |
| 2003/0131245 A1 | 7/2003 | Linderman |
| 2003/0157947 A1 | 8/2003 | Fiatal et al. |
| 2003/0188193 A1 | 10/2003 | Venkataramappa |
| 2003/0221184 A1 | 11/2003 | Gunjal et al. |
| 2003/0229623 A1 | 12/2003 | Chang et al. |
| 2003/0229786 A1 | 12/2003 | Hollis et al. |
| 2003/0236861 A1 | 12/2003 | Johnson et al. |
| 2004/0006706 A1 | 1/2004 | Erlingsson |
| 2004/0010575 A1 | 1/2004 | Wookey et al. |
| 2004/0010579 A1 | 1/2004 | Freese |
| 2004/0012041 A1 | 1/2004 | West et al. |
| 2004/0083273 A1 | 4/2004 | Madison et al. |
| 2004/0096152 A1 | 5/2004 | Nakama et al. |
| 2004/0107342 A1 | 6/2004 | Pham et al. |
| 2004/0111640 A1 | 6/2004 | Baum |
| 2004/0114853 A1 | 6/2004 | Bjorkman et al. |
| 2004/0117651 A1 | 6/2004 | Little et al. |
| 2004/0123153 A1 | 6/2004 | Wright et al. |
| 2004/0205233 A1 | 10/2004 | Dunk |
| 2004/0230807 A1 | 11/2004 | Baird et al. |
| 2004/0243349 A1 | 12/2004 | Greifeneder et al. |
| 2004/0243699 A1 | 12/2004 | Koclanes et al. |
| 2005/0027843 A1 | 2/2005 | Bozak et al. |
| 2005/0027862 A1 | 2/2005 | Nguyen et al. |
| 2005/0055578 A1 | 3/2005 | Wright et al. |
| 2005/0063637 A1 | 3/2005 | Mershon et al. |
| 2005/0076082 A1 | 4/2005 | Le Pennec et al. |
| 2005/0076085 A1 | 4/2005 | Budd et al. |
| 2005/0086328 A1 | 4/2005 | Landram et al. |
| 2005/0097608 A1 | 5/2005 | Penke et al. |
| 2005/0111354 A1 | 5/2005 | Asano et al. |
| 2005/0120101 A1 | 6/2005 | Nocera |
| 2005/0149340 A1 | 7/2005 | Murakami et al. |
| 2005/0166264 A1 | 7/2005 | Yamada et al. |
| 2005/0172241 A1 | 8/2005 | Daniels et al. |
| 2005/0193222 A1 | 9/2005 | Greene |
| 2005/0210252 A1 | 9/2005 | Freeman et al. |
| 2005/0210289 A1 | 9/2005 | Brown et al. |
| 2005/0255838 A1 | 11/2005 | Adams et al. |
| 2005/0262429 A1 | 11/2005 | Elder et al. |
| 2005/0265548 A1 | 12/2005 | Tsuchimura |
| 2005/0273592 A1 | 12/2005 | Pryor et al. |
| 2006/0005250 A1 | 1/2006 | Chu et al. |
| 2006/0031679 A1 | 2/2006 | Soltis et al. |
| 2006/0048142 A1 | 3/2006 | Roese et al. |
| 2006/0070114 A1 | 3/2006 | Wood et al. |
| 2006/0075036 A1 | 4/2006 | Malik |
| 2006/0075123 A1 | 4/2006 | Burr et al. |
| 2006/0080432 A1 | 4/2006 | Spataro et al. |
| 2006/0085826 A1 | 4/2006 | Funk et al. |
| 2006/0094400 A1 | 5/2006 | Beachem et al. |
| 2006/0105479 A1 | 5/2006 | Cave et al. |
| 2006/0112428 A1 | 5/2006 | Etelapera |
| 2006/0117104 A1 | 6/2006 | Taniguchi et al. |
| 2006/0120526 A1 | 6/2006 | Boucher et al. |
| 2006/0123101 A1 | 6/2006 | Buccella et al. |
| 2006/0141985 A1 | 6/2006 | Patel et al. |
| 2006/0147043 A1 | 7/2006 | Mann et al. |
| 2006/0161635 A1 | 7/2006 | Lamkin et al. |
| 2006/0161783 A1 | 7/2006 | Aiken et al. |
| 2006/0185004 A1 | 8/2006 | Song et al. |
| 2006/0200814 A1 | 9/2006 | Kontinen et al. |
| 2006/0224742 A1 | 10/2006 | Shahbazi |
| 2006/0225033 A1 | 10/2006 | Ye et al. |
| 2006/0225142 A1 | 10/2006 | Moon |
| 2006/0242685 A1 | 10/2006 | Heard et al. |

(56) References Cited

U.S. PATENT DOCUMENTS

| | | |
|---|---|---|
| 2006/0248577 A1 | 11/2006 | Beghian et al. |
| 2006/0253508 A1 | 11/2006 | Colton et al. |
| 2006/0256739 A1 | 11/2006 | Seier et al. |
| 2006/0259755 A1 | 11/2006 | Kenoyer |
| 2006/0277590 A1 | 12/2006 | Limont et al. |
| 2006/0282876 A1 | 12/2006 | Shelest et al. |
| 2006/0282889 A1 | 12/2006 | Brown et al. |
| 2007/0005713 A1 | 1/2007 | LeVasseur et al. |
| 2007/0006289 A1 | 1/2007 | Limont et al. |
| 2007/0006327 A1 | 1/2007 | Lal et al. |
| 2007/0011749 A1 | 1/2007 | Allison et al. |
| 2007/0016771 A1 | 1/2007 | Allison et al. |
| 2007/0016907 A1 | 1/2007 | Benedetti et al. |
| 2007/0024646 A1 | 2/2007 | Saarinen et al. |
| 2007/0038764 A1 | 2/2007 | Maillard |
| 2007/0049297 A1 | 3/2007 | Gopalan et al. |
| 2007/0054627 A1 | 3/2007 | Wormald |
| 2007/0056043 A1 | 3/2007 | Onyon et al. |
| 2007/0072598 A1 | 3/2007 | Coleman et al. |
| 2007/0074033 A1 | 3/2007 | Adams et al. |
| 2007/0079249 A1 | 4/2007 | Pall et al. |
| 2007/0088825 A1 | 4/2007 | Hodul |
| 2007/0094220 A1 | 4/2007 | McCaffrey |
| 2007/0100938 A1 | 5/2007 | Bagley et al. |
| 2007/0109983 A1 | 5/2007 | Shankar et al. |
| 2007/0118558 A1 | 5/2007 | Kahandaliyanage |
| 2007/0136471 A1 | 6/2007 | Jardin |
| 2007/0143515 A1 | 6/2007 | Kershaw et al. |
| 2007/0156897 A1 | 7/2007 | Lim |
| 2007/0180447 A1 | 8/2007 | Mazzaferri et al. |
| 2007/0180450 A1 | 8/2007 | Croft et al. |
| 2007/0180509 A1 | 8/2007 | Swartz et al. |
| 2007/0186106 A1 | 8/2007 | Ting et al. |
| 2007/0198656 A1 | 8/2007 | Mazzaferri et al. |
| 2007/0199051 A1 | 8/2007 | Parikh et al. |
| 2007/0204153 A1 | 8/2007 | Tome et al. |
| 2007/0204166 A1 | 8/2007 | Tome et al. |
| 2007/0208936 A1 | 9/2007 | Ramos Robles |
| 2007/0214272 A1 | 9/2007 | Isaacson |
| 2007/0226034 A1 | 9/2007 | Khan |
| 2007/0226225 A1 | 9/2007 | Yiu et al. |
| 2007/0226227 A1 | 9/2007 | Helfman |
| 2007/0226773 A1 | 9/2007 | Pouliot |
| 2007/0244987 A1 | 10/2007 | Pedersen et al. |
| 2007/0245409 A1 | 10/2007 | Harris et al. |
| 2007/0248085 A1 | 10/2007 | Volpano |
| 2007/0253663 A1 | 11/2007 | Keyser et al. |
| 2007/0262327 A1 | 11/2007 | Shimooka |
| 2007/0266421 A1 | 11/2007 | Vaidya et al. |
| 2007/0266422 A1 | 11/2007 | Germano et al. |
| 2007/0283324 A1 | 12/2007 | Geisinger |
| 2008/0027871 A1 | 1/2008 | Seo |
| 2008/0027982 A1 | 1/2008 | Subramanian et al. |
| 2008/0040775 A1 | 2/2008 | Hoff et al. |
| 2008/0046580 A1 | 2/2008 | Lafuente et al. |
| 2008/0047006 A1 | 2/2008 | Jeong et al. |
| 2008/0047015 A1 | 2/2008 | Cornwall et al. |
| 2008/0052395 A1 | 2/2008 | Wright et al. |
| 2008/0066020 A1 | 3/2008 | Boss et al. |
| 2008/0066177 A1 | 3/2008 | Bender |
| 2008/0070495 A1 | 3/2008 | Stricklen et al. |
| 2008/0085075 A1 | 4/2008 | Kishima |
| 2008/0092215 A1 | 4/2008 | Soukup et al. |
| 2008/0127292 A1 | 5/2008 | Cooper et al. |
| 2008/0127327 A1 | 5/2008 | Carrasco |
| 2008/0133729 A1 | 6/2008 | Fridman et al. |
| 2008/0134292 A1 | 6/2008 | Ariel et al. |
| 2008/0141335 A1 | 6/2008 | Thomas |
| 2008/0163188 A1 | 7/2008 | Siskind et al. |
| 2008/0163286 A1 | 7/2008 | Rudolph et al. |
| 2008/0167002 A1 | 7/2008 | Kim et al. |
| 2008/0178169 A1 | 7/2008 | Grossner et al. |
| 2008/0178300 A1 | 7/2008 | Brown et al. |
| 2008/0183820 A1 | 7/2008 | Golovchinsky et al. |
| 2008/0183996 A1 | 7/2008 | Field et al. |
| 2008/0192739 A1 | 8/2008 | Carrasco |
| 2008/0194296 A1 | 8/2008 | Roundtree |
| 2008/0196038 A1 | 8/2008 | Antonio et al. |
| 2008/0196082 A1 | 8/2008 | Sandoval et al. |
| 2008/0209506 A1 | 8/2008 | Ghai et al. |
| 2008/0209564 A1 | 8/2008 | Gayde et al. |
| 2008/0214300 A1 | 9/2008 | Williams et al. |
| 2008/0222707 A1 | 9/2008 | Pathuri et al. |
| 2008/0229117 A1 | 9/2008 | Shin et al. |
| 2008/0235760 A1 | 9/2008 | Broussard et al. |
| 2008/0263224 A1 | 10/2008 | Gilhuly et al. |
| 2008/0270240 A1 | 10/2008 | Chu |
| 2008/0271111 A1 | 10/2008 | Cox et al. |
| 2008/0282314 A1 | 11/2008 | Abzarian et al. |
| 2008/0301639 A1 | 12/2008 | Bell et al. |
| 2008/0304665 A1 | 12/2008 | Ma et al. |
| 2008/0310623 A1 | 12/2008 | Phillips, II et al. |
| 2008/0313257 A1 | 12/2008 | Allen et al. |
| 2008/0313648 A1 | 12/2008 | Wang et al. |
| 2008/0317292 A1 | 12/2008 | Baker et al. |
| 2008/0318616 A1 | 12/2008 | Chipalkatti et al. |
| 2009/0006232 A1 | 1/2009 | Gallagher et al. |
| 2009/0028049 A1 | 1/2009 | Boudreau et al. |
| 2009/0030968 A1 | 1/2009 | Boudreau et al. |
| 2009/0037686 A1 | 2/2009 | Mendonca |
| 2009/0037976 A1 | 2/2009 | Teo et al. |
| 2009/0049425 A1 | 2/2009 | Liepert et al. |
| 2009/0051755 A1 | 2/2009 | Toya et al. |
| 2009/0064292 A1 | 3/2009 | Carter et al. |
| 2009/0067079 A1 | 3/2009 | Al-Azzawi |
| 2009/0075630 A1 | 3/2009 | McLean |
| 2009/0077638 A1 | 3/2009 | Norman et al. |
| 2009/0083374 A1 | 3/2009 | Saint Clair |
| 2009/0100060 A1 | 4/2009 | Livnat et al. |
| 2009/0119773 A1 | 5/2009 | D'Amore et al. |
| 2009/0121890 A1 | 5/2009 | Brown et al. |
| 2009/0170532 A1 | 7/2009 | Lee et al. |
| 2009/0172657 A1 | 7/2009 | Makelainen et al. |
| 2009/0172789 A1 | 7/2009 | Band et al. |
| 2009/0178111 A1 | 7/2009 | Moriconi et al. |
| 2009/0183227 A1 | 7/2009 | Isaacs et al. |
| 2009/0187763 A1 | 7/2009 | Freericks et al. |
| 2009/0199178 A1 | 8/2009 | Keller et al. |
| 2009/0199277 A1 | 8/2009 | Norman et al. |
| 2009/0210360 A1 | 8/2009 | Sankar et al. |
| 2009/0210934 A1 | 8/2009 | Innes |
| 2009/0221278 A1 | 9/2009 | Spelta et al. |
| 2009/0222880 A1 | 9/2009 | Mayer et al. |
| 2009/0228714 A1 | 9/2009 | Fiske et al. |
| 2009/0228954 A1 | 9/2009 | Hu et al. |
| 2009/0228963 A1 | 9/2009 | Pearce et al. |
| 2009/0249359 A1 | 10/2009 | Caunter et al. |
| 2009/0253410 A1 | 10/2009 | Fitzgerald et al. |
| 2009/0253412 A1 | 10/2009 | Sigmund et al. |
| 2009/0263923 A1 | 10/2009 | Shimooka |
| 2009/0265554 A1 | 10/2009 | Robles et al. |
| 2009/0271355 A1 | 10/2009 | Sekiguchi |
| 2009/0282127 A1 | 11/2009 | Leblanc et al. |
| 2009/0282473 A1 | 11/2009 | Karlson et al. |
| 2009/0319772 A1 | 12/2009 | Singh et al. |
| 2009/0323916 A1 | 12/2009 | O'Sullivan et al. |
| 2009/0325615 A1 | 12/2009 | McKay et al. |
| 2009/0327885 A1 | 12/2009 | Aoki et al. |
| 2009/0327994 A1 | 12/2009 | Christensen et al. |
| 2010/0049874 A1 | 2/2010 | Chene et al. |
| 2010/0050092 A1 | 2/2010 | Williams et al. |
| 2010/0054463 A1 | 3/2010 | Tsan |
| 2010/0058352 A1 | 3/2010 | Esfahany et al. |
| 2010/0064341 A1 | 3/2010 | Aldera |
| 2010/0064354 A1 | 3/2010 | Irvine |
| 2010/0077445 A1 | 3/2010 | Schneider et al. |
| 2010/0077469 A1 | 3/2010 | Furman et al. |
| 2010/0083358 A1 | 4/2010 | Govindarajan et al. |
| 2010/0100825 A1 | 4/2010 | Sharoni |
| 2010/0100925 A1 | 4/2010 | Hinton |
| 2010/0124196 A1 | 5/2010 | Bonar et al. |
| 2010/0125730 A1 | 5/2010 | Dodgson et al. |
| 2010/0146523 A1 | 6/2010 | Brigaut et al. |
| 2010/0146582 A1 | 6/2010 | Jaber et al. |

(56) References Cited

U.S. PATENT DOCUMENTS

| | | |
|---|---|---|
| 2010/0150341 A1 | 6/2010 | Dodgson et al. |
| 2010/0154025 A1 | 6/2010 | Esteve Balducci et al. |
| 2010/0162232 A1 | 6/2010 | Bhatia et al. |
| 2010/0173607 A1 | 7/2010 | Thornton et al. |
| 2010/0180346 A1 | 7/2010 | Nicolson et al. |
| 2010/0192212 A1 | 7/2010 | Raleigh |
| 2010/0218167 A1 | 8/2010 | Turner et al. |
| 2010/0228825 A1 | 9/2010 | Hegde et al. |
| 2010/0228961 A1 | 9/2010 | Burns et al. |
| 2010/0229197 A1 | 9/2010 | Yi et al. |
| 2010/0235216 A1 | 9/2010 | Hehmeyer et al. |
| 2010/0235881 A1 | 9/2010 | Liu et al. |
| 2010/0248699 A1 | 9/2010 | Dumais |
| 2010/0257580 A1 | 10/2010 | Zhao et al. |
| 2010/0262959 A1 | 10/2010 | Bruno et al. |
| 2010/0269156 A1 | 10/2010 | Hohlfeld et al. |
| 2010/0279652 A1 | 11/2010 | Sharp et al. |
| 2010/0281528 A1 | 11/2010 | Hayton et al. |
| 2010/0287619 A1 | 11/2010 | Chase |
| 2010/0299152 A1 | 11/2010 | Batchu et al. |
| 2010/0299376 A1 | 11/2010 | Batchu et al. |
| 2010/0317336 A1 | 12/2010 | Ferren et al. |
| 2010/0318992 A1 | 12/2010 | Kushwaha et al. |
| 2010/0319053 A1 | 12/2010 | Gharabally |
| 2010/0325097 A1 | 12/2010 | Er et al. |
| 2010/0331017 A1 | 12/2010 | Ariga |
| 2010/0333165 A1 | 12/2010 | Basak et al. |
| 2011/0030044 A1 | 2/2011 | Kranendonk et al. |
| 2011/0072492 A1 | 3/2011 | Mohler et al. |
| 2011/0078675 A1 | 3/2011 | Van Camp et al. |
| 2011/0082900 A1 | 4/2011 | Nagpal et al. |
| 2011/0099602 A1 | 4/2011 | Apparao et al. |
| 2011/0145360 A1 | 6/2011 | Sheshagiri et al. |
| 2011/0145833 A1 | 6/2011 | De Los Reyes et al. |
| 2011/0154266 A1 | 6/2011 | Friend et al. |
| 2011/0154305 A1 | 6/2011 | LeRoux et al. |
| 2011/0154477 A1 | 6/2011 | Parla et al. |
| 2011/0154498 A1 | 6/2011 | Fissel et al. |
| 2011/0167492 A1 | 7/2011 | Ghosh et al. |
| 2011/0179484 A1 | 7/2011 | Tuvell et al. |
| 2011/0208797 A1 | 8/2011 | Kim |
| 2011/0208838 A1 | 8/2011 | Thomas et al. |
| 2011/0209064 A1 | 8/2011 | Jorgensen et al. |
| 2011/0209194 A1 | 8/2011 | Kennedy |
| 2011/0219124 A1 | 9/2011 | Allen et al. |
| 2011/0225417 A1 | 9/2011 | Maharajh et al. |
| 2011/0230211 A1 | 9/2011 | Kim et al. |
| 2011/0239125 A1 | 9/2011 | Kristensen et al. |
| 2011/0252232 A1 | 10/2011 | De Atley et al. |
| 2011/0252459 A1 | 10/2011 | Walsh et al. |
| 2011/0258301 A1 | 10/2011 | McCormick et al. |
| 2011/0270963 A1 | 11/2011 | Saito et al. |
| 2011/0271279 A1 | 11/2011 | Pate |
| 2011/0276683 A1 | 11/2011 | Goldschlag et al. |
| 2011/0276699 A1 | 11/2011 | Pedersen |
| 2011/0277026 A1 | 11/2011 | Agarwal et al. |
| 2011/0277027 A1 | 11/2011 | Hayton et al. |
| 2011/0283347 A1 | 11/2011 | Bhuta et al. |
| 2011/0295970 A1 | 12/2011 | Miyazawa |
| 2011/0296333 A1 | 12/2011 | Bateman et al. |
| 2011/0314467 A1 | 12/2011 | Pearson |
| 2011/0314534 A1 | 12/2011 | James |
| 2012/0002813 A1 | 1/2012 | Wei et al. |
| 2012/0005476 A1 | 1/2012 | Wei et al. |
| 2012/0005724 A1 | 1/2012 | Lee |
| 2012/0005745 A1 | 1/2012 | Wei et al. |
| 2012/0005746 A1 | 1/2012 | Wei et al. |
| 2012/0023378 A1 | 1/2012 | Nomura et al. |
| 2012/0023506 A1 | 1/2012 | Maeckel et al. |
| 2012/0023556 A1 | 1/2012 | Schultz et al. |
| 2012/0030649 A1 | 2/2012 | Chapa |
| 2012/0036347 A1 | 2/2012 | Swanson et al. |
| 2012/0036370 A1 | 2/2012 | Lim et al. |
| 2012/0042036 A1 | 2/2012 | Lau et al. |
| 2012/0052954 A1 | 3/2012 | Zhu et al. |
| 2012/0054853 A1 | 3/2012 | Gupta et al. |
| 2012/0066691 A1 | 3/2012 | Branton |
| 2012/0079475 A1 | 3/2012 | Hicks, III et al. |
| 2012/0079556 A1 | 3/2012 | Wahl |
| 2012/0079603 A1 | 3/2012 | Brown et al. |
| 2012/0079609 A1 | 3/2012 | Bender et al. |
| 2012/0084184 A1 | 4/2012 | Raleigh et al. |
| 2012/0088540 A1 | 4/2012 | Smith et al. |
| 2012/0096533 A1 | 4/2012 | Boulos et al. |
| 2012/0096544 A1 | 4/2012 | Hosoda |
| 2012/0099219 A1 | 4/2012 | Al-Azzawi |
| 2012/0102195 A1 | 4/2012 | Adams et al. |
| 2012/0102564 A1 | 4/2012 | Schentrup et al. |
| 2012/0109384 A1 | 5/2012 | Stepanian |
| 2012/0110317 A1 | 5/2012 | Scheer et al. |
| 2012/0117622 A1 | 5/2012 | Gronholm et al. |
| 2012/0129503 A1 | 5/2012 | Lindeman et al. |
| 2012/0131116 A1 | 5/2012 | Tu et al. |
| 2012/0131343 A1 | 5/2012 | Choi et al. |
| 2012/0131685 A1 | 5/2012 | Broch et al. |
| 2012/0137364 A1 | 5/2012 | Blaisdell |
| 2012/0151033 A1 | 6/2012 | Baliga et al. |
| 2012/0154265 A1 | 6/2012 | Kim et al. |
| 2012/0154413 A1 | 6/2012 | Kim et al. |
| 2012/0157165 A1 | 6/2012 | Kim et al. |
| 2012/0157166 A1 | 6/2012 | Kim et al. |
| 2012/0159139 A1 | 6/2012 | Kim et al. |
| 2012/0159334 A1 | 6/2012 | Messerly et al. |
| 2012/0165075 A1 | 6/2012 | Kim et al. |
| 2012/0166516 A1 | 6/2012 | Simmons et al. |
| 2012/0166524 A1 | 6/2012 | Watakabe et al. |
| 2012/0166966 A1 | 6/2012 | Wood et al. |
| 2012/0166997 A1 | 6/2012 | Cho et al. |
| 2012/0167118 A1 | 6/2012 | Pingili et al. |
| 2012/0167159 A1 | 6/2012 | Mefford, Jr. et al. |
| 2012/0173687 A1 | 7/2012 | Brown et al. |
| 2012/0174237 A1 | 7/2012 | Krzyzanowski |
| 2012/0179802 A1 | 7/2012 | Narasimhan et al. |
| 2012/0179904 A1 | 7/2012 | Dunn et al. |
| 2012/0179909 A1 | 7/2012 | Sagi et al. |
| 2012/0185910 A1 | 7/2012 | Miettinen et al. |
| 2012/0185913 A1 | 7/2012 | Martinez et al. |
| 2012/0191716 A1 | 7/2012 | Omoigui |
| 2012/0192181 A1 | 7/2012 | Gilbert et al. |
| 2012/0198570 A1 | 8/2012 | Joa et al. |
| 2012/0204220 A1 | 8/2012 | Lavi |
| 2012/0209949 A1 | 8/2012 | Deliyannis et al. |
| 2012/0210068 A1 | 8/2012 | Joshi et al. |
| 2012/0210443 A1 | 8/2012 | Blaisdell et al. |
| 2012/0214472 A1 | 8/2012 | Tadayon et al. |
| 2012/0222120 A1 | 8/2012 | Rim et al. |
| 2012/0233130 A1 | 9/2012 | Vedachalam et al. |
| 2012/0238206 A1 | 9/2012 | Singh et al. |
| 2012/0238257 A1 | 9/2012 | Anson |
| 2012/0240183 A1 | 9/2012 | Sinha |
| 2012/0246191 A1 | 9/2012 | Kiong |
| 2012/0246484 A1 | 9/2012 | Blaisdell et al. |
| 2012/0246731 A1 | 9/2012 | Blaisdell et al. |
| 2012/0250106 A1 | 10/2012 | Kiran Kannambadi et al. |
| 2012/0254768 A1 | 10/2012 | Aggarwal et al. |
| 2012/0255026 A1 | 10/2012 | Baca et al. |
| 2012/0265528 A1 | 10/2012 | Gruber et al. |
| 2012/0265792 A1 | 10/2012 | Salters |
| 2012/0270522 A1 | 10/2012 | Laudermilch et al. |
| 2012/0272221 A1 | 10/2012 | Pessoa et al. |
| 2012/0278454 A1 | 11/2012 | Stewart et al. |
| 2012/0284325 A1 | 11/2012 | Erb |
| 2012/0284529 A1 * | 11/2012 | Crowe .............. G06F 21/6227 713/189 |
| 2012/0284779 A1 | 11/2012 | Ingrassia, Jr. et al. |
| 2012/0290694 A9 | 11/2012 | Marl et al. |
| 2012/0291114 A1 | 11/2012 | Poliashenko et al. |
| 2012/0303476 A1 * | 11/2012 | Krzyzanowski .......... G06F 8/60 705/26.5 |
| 2012/0303778 A1 | 11/2012 | Ahiska et al. |
| 2012/0304310 A1 | 11/2012 | Blaisdell |
| 2012/0311154 A1 | 12/2012 | Morgan |
| 2012/0311659 A1 | 12/2012 | Narain et al. |
| 2012/0317185 A1 | 12/2012 | Shah et al. |

(56) References Cited

U.S. PATENT DOCUMENTS

| | | |
|---|---|---|
| 2012/0321087 A1 | 12/2012 | Fleischman et al. |
| 2012/0324568 A1 | 12/2012 | Wyatt et al. |
| 2012/0331088 A1 | 12/2012 | O'Hare et al. |
| 2012/0331527 A1 | 12/2012 | Walters et al. |
| 2012/0331528 A1 | 12/2012 | Fu et al. |
| 2013/0002725 A1 | 1/2013 | Kim et al. |
| 2013/0007245 A1 | 1/2013 | Malik et al. |
| 2013/0007842 A1 | 1/2013 | Park et al. |
| 2013/0013653 A1 | 1/2013 | Thompson |
| 2013/0013688 A1 | 1/2013 | Wang et al. |
| 2013/0013727 A1 | 1/2013 | Walker |
| 2013/0013932 A1 | 1/2013 | Kong et al. |
| 2013/0014239 A1 | 1/2013 | Pieczul et al. |
| 2013/0014267 A1 | 1/2013 | Farrugia et al. |
| 2013/0019013 A1 | 1/2013 | Rice et al. |
| 2013/0019018 A1 | 1/2013 | Rice |
| 2013/0019282 A1 | 1/2013 | Rice et al. |
| 2013/0024424 A1 | 1/2013 | Prahlad et al. |
| 2013/0024928 A1 | 1/2013 | Burke et al. |
| 2013/0031544 A1 | 1/2013 | Sridharan et al. |
| 2013/0035063 A1 | 2/2013 | Fisk et al. |
| 2013/0042294 A1 | 2/2013 | Colvin et al. |
| 2013/0042295 A1* | 2/2013 | Kelly ............ G06F 21/53 726/1 |
| 2013/0054674 A1 | 2/2013 | Myers et al. |
| 2013/0054895 A1 | 2/2013 | Tuch et al. |
| 2013/0054922 A1 | 2/2013 | Tuch et al. |
| 2013/0054962 A1 | 2/2013 | Chawla et al. |
| 2013/0055378 A1 | 2/2013 | Chang et al. |
| 2013/0059284 A1 | 3/2013 | Giedgowd, Jr. et al. |
| 2013/0066960 A1 | 3/2013 | Fieremans et al. |
| 2013/0066978 A1 | 3/2013 | Bentley et al. |
| 2013/0067229 A1 | 3/2013 | German et al. |
| 2013/0074142 A1 | 3/2013 | Brennan et al. |
| 2013/0078949 A1 | 3/2013 | Pecen et al. |
| 2013/0081104 A1 | 3/2013 | Jung et al. |
| 2013/0084847 A1 | 4/2013 | Tibbitts et al. |
| 2013/0086479 A1 | 4/2013 | Brown et al. |
| 2013/0086684 A1 | 4/2013 | Mohler |
| 2013/0088605 A1 | 4/2013 | Quarfordt et al. |
| 2013/0091205 A1 | 4/2013 | Kotler et al. |
| 2013/0091440 A1 | 4/2013 | Kotler et al. |
| 2013/0091543 A1 | 4/2013 | Wade et al. |
| 2013/0095785 A1 | 4/2013 | Sadana et al. |
| 2013/0097296 A1 | 4/2013 | Gehrmann et al. |
| 2013/0097421 A1 | 4/2013 | Lim |
| 2013/0097660 A1 | 4/2013 | Das et al. |
| 2013/0103797 A1 | 4/2013 | Park et al. |
| 2013/0111540 A1 | 5/2013 | Sabin |
| 2013/0117240 A1 | 5/2013 | Taylor et al. |
| 2013/0117563 A1 | 5/2013 | Grabelkovsky |
| 2013/0117742 A1 | 5/2013 | Newell |
| 2013/0117805 A1 | 5/2013 | Kent et al. |
| 2013/0117840 A1 | 5/2013 | Roesner et al. |
| 2013/0124673 A1 | 5/2013 | Hjelm et al. |
| 2013/0130651 A1 | 5/2013 | Deasy et al. |
| 2013/0130652 A1 | 5/2013 | Deasy et al. |
| 2013/0130653 A1 | 5/2013 | Deasy et al. |
| 2013/0130669 A1 | 5/2013 | Xiao et al. |
| 2013/0132457 A1 | 5/2013 | Diwakar |
| 2013/0132941 A1 | 5/2013 | Lindeman et al. |
| 2013/0133043 A1 | 5/2013 | Barkie et al. |
| 2013/0133061 A1 | 5/2013 | Fainkichen et al. |
| 2013/0138766 A1 | 5/2013 | Draluk et al. |
| 2013/0138810 A1 | 5/2013 | Binyamin et al. |
| 2013/0138932 A1 | 5/2013 | Draluk et al. |
| 2013/0138954 A1 | 5/2013 | Draluk et al. |
| 2013/0139241 A1 | 5/2013 | Leeder |
| 2013/0142043 A1 | 6/2013 | Tapia et al. |
| 2013/0144934 A1 | 6/2013 | Swett et al. |
| 2013/0145448 A1 | 6/2013 | Newell |
| 2013/0151598 A1 | 6/2013 | Fu et al. |
| 2013/0151681 A1 | 6/2013 | Dournov et al. |
| 2013/0167247 A1 | 6/2013 | Brown et al. |
| 2013/0171967 A1 | 7/2013 | Ashour et al. |
| 2013/0212212 A1 | 8/2013 | Addepalli et al. |
| 2013/0219022 A1 | 8/2013 | Manivel et al. |
| 2013/0219176 A1 | 8/2013 | Akella et al. |
| 2013/0219211 A1 | 8/2013 | Gopinath et al. |
| 2013/0219456 A1 | 8/2013 | Sharma et al. |
| 2013/0219465 A1* | 8/2013 | Tse ............ H04L 63/10 726/3 |
| 2013/0227551 A1 | 8/2013 | Tsirkin |
| 2013/0227561 A1 | 8/2013 | Walsh et al. |
| 2013/0227636 A1 | 8/2013 | Bettini et al. |
| 2013/0227659 A1 | 8/2013 | Raleigh |
| 2013/0232541 A1 | 9/2013 | Kapadia et al. |
| 2013/0237152 A1 | 9/2013 | Taggar et al. |
| 2013/0239192 A1* | 9/2013 | Linga ............ G06F 21/44 726/7 |
| 2013/0254262 A1 | 9/2013 | Udall |
| 2013/0254660 A1 | 9/2013 | Fujioka |
| 2013/0254831 A1 | 9/2013 | Roach et al. |
| 2013/0260730 A1 | 10/2013 | Toy et al. |
| 2013/0263208 A1 | 10/2013 | Challa |
| 2013/0263209 A1 | 10/2013 | Panuganty |
| 2013/0268676 A1 | 10/2013 | Martins et al. |
| 2013/0283335 A1 | 10/2013 | Lakshminarayanan et al. |
| 2013/0288656 A1 | 10/2013 | Schultz et al. |
| 2013/0290709 A1 | 10/2013 | Muppidi et al. |
| 2013/0291052 A1 | 10/2013 | Hadar et al. |
| 2013/0291055 A1 | 10/2013 | Muppidi et al. |
| 2013/0291086 A1 | 10/2013 | Pontillo et al. |
| 2013/0297604 A1 | 11/2013 | Sutedja et al. |
| 2013/0297662 A1 | 11/2013 | Sharma et al. |
| 2013/0298185 A1 | 11/2013 | Koneru et al. |
| 2013/0298201 A1 | 11/2013 | Aravindakshan et al. |
| 2013/0298242 A1 | 11/2013 | Kumar et al. |
| 2013/0303194 A1 | 11/2013 | Rowles |
| 2013/0305354 A1 | 11/2013 | King et al. |
| 2013/0311593 A1 | 11/2013 | Prince et al. |
| 2013/0311597 A1 | 11/2013 | Arrouye et al. |
| 2013/0317952 A1 | 11/2013 | Tomassetti et al. |
| 2013/0318345 A1 | 11/2013 | Hengeveld |
| 2013/0326492 A1 | 12/2013 | Hunt et al. |
| 2013/0333005 A1 | 12/2013 | Kim et al. |
| 2013/0346268 A1 | 12/2013 | Pereira et al. |
| 2013/0347130 A1 | 12/2013 | Sima |
| 2014/0006347 A1 | 1/2014 | Qureshi et al. |
| 2014/0006512 A1 | 1/2014 | Huang et al. |
| 2014/0007183 A1 | 1/2014 | Qureshi et al. |
| 2014/0007214 A1 | 1/2014 | Qureshi et al. |
| 2014/0007215 A1 | 1/2014 | Romano et al. |
| 2014/0007222 A1 | 1/2014 | Qureshi et al. |
| 2014/0012983 A1 | 1/2014 | Brown et al. |
| 2014/0020062 A1 | 1/2014 | Tumula et al. |
| 2014/0020073 A1 | 1/2014 | Ronda et al. |
| 2014/0026128 A1 | 1/2014 | Rocha De la Hoz et al. |
| 2014/0032691 A1 | 1/2014 | Barton et al. |
| 2014/0032733 A1 | 1/2014 | Barton et al. |
| 2014/0032758 A1 | 1/2014 | Barton et al. |
| 2014/0032759 A1 | 1/2014 | Barton et al. |
| 2014/0033271 A1 | 1/2014 | Barton et al. |
| 2014/0040638 A1 | 2/2014 | Barton et al. |
| 2014/0040656 A1 | 2/2014 | Ho et al. |
| 2014/0040977 A1 | 2/2014 | Barton et al. |
| 2014/0040978 A1 | 2/2014 | Barton et al. |
| 2014/0040979 A1 | 2/2014 | Barton et al. |
| 2014/0047413 A1 | 2/2014 | Shelve et al. |
| 2014/0047535 A1 | 2/2014 | Parla et al. |
| 2014/0049496 A1 | 2/2014 | Szalkowski |
| 2014/0059640 A9 | 2/2014 | Raleigh et al. |
| 2014/0059642 A1 | 2/2014 | Deasy et al. |
| 2014/0096199 A1 | 4/2014 | Dave et al. |
| 2014/0096227 A1 | 4/2014 | Barbara et al. |
| 2014/0096230 A1 | 4/2014 | Wade |
| 2014/0108558 A1 | 4/2014 | Borzycki et al. |
| 2014/0108649 A1 | 4/2014 | Barton et al. |
| 2014/0109072 A1 | 4/2014 | Lang et al. |
| 2014/0109078 A1 | 4/2014 | Lang et al. |
| 2014/0111316 A1 | 4/2014 | Kim |
| 2014/0115693 A1* | 4/2014 | Schieman ............ G06F 21/6218 726/17 |
| 2014/0120961 A1 | 5/2014 | Buck |

(56) References Cited

U.S. PATENT DOCUMENTS

| | | |
|---|---|---|
| 2014/0122645 A1 | 5/2014 | Brown et al. |
| 2014/0130174 A1 | 5/2014 | Celi, Jr. et al. |
| 2014/0137205 A1 | 5/2014 | Brown et al. |
| 2014/0149599 A1 | 5/2014 | Krishna et al. |
| 2014/0162614 A1 | 6/2014 | Lindeman et al. |
| 2014/0164946 A1 | 6/2014 | Brown |
| 2014/0173700 A1 | 6/2014 | Awan et al. |
| 2014/0181803 A1 | 6/2014 | Cooper et al. |
| 2014/0181934 A1 | 6/2014 | Mayblum et al. |
| 2014/0189670 A1 | 7/2014 | Clay |
| 2014/0189781 A1* | 7/2014 | Manickam ............ H04L 67/34 726/1 |
| 2014/0189808 A1 | 7/2014 | Mahaffey et al. |
| 2014/0228014 A1 | 8/2014 | Tervo et al. |
| 2014/0259178 A1* | 9/2014 | Karaa .................. G06F 8/61 726/27 |
| 2014/0280962 A1 | 9/2014 | Schultz |
| 2014/0281475 A1 | 9/2014 | Schultz |
| 2014/0281499 A1 | 9/2014 | Schentrup et al. |
| 2014/0282460 A1* | 9/2014 | Cai ...................... G06F 8/62 717/168 |
| 2014/0282876 A1 | 9/2014 | Schentrup et al. |
| 2014/0283030 A1 | 9/2014 | Moore et al. |
| 2014/0298401 A1 | 10/2014 | Batson et al. |
| 2014/0315536 A1 | 10/2014 | Chow et al. |
| 2014/0317273 A1 | 10/2014 | Kruglick |
| 2014/0317704 A1 | 10/2014 | Schentrup et al. |
| 2014/0330990 A1 | 11/2014 | Lang et al. |
| 2014/0359117 A1 | 12/2014 | Dare et al. |
| 2014/0366015 A1 | 12/2014 | Dobson et al. |
| 2014/0379567 A1 | 12/2014 | Schentrup et al. |
| 2015/0026827 A1 | 1/2015 | Kao et al. |
| 2015/0074057 A1 | 3/2015 | Brown et al. |
| 2015/0081644 A1 | 3/2015 | Pitts |
| 2015/0082191 A1 | 3/2015 | Dietz |
| 2015/0087270 A1 | 3/2015 | Richardson et al. |
| 2015/0113502 A1 | 4/2015 | Wade |
| 2015/0113506 A1 | 4/2015 | Wade |
| 2015/0135160 A1 | 5/2015 | Gauvin et al. |
| 2015/0138945 A1 | 5/2015 | Carrillo |
| 2015/0149232 A1 | 5/2015 | Dietz |
| 2015/0205952 A1 | 7/2015 | Weiss |
| 2015/0206451 A1 | 7/2015 | Schultz |
| 2015/0227115 A1 | 8/2015 | Dietz |
| 2015/0277941 A1 | 10/2015 | Dobson et al. |
| 2015/0341362 A1 | 11/2015 | Dobson et al. |
| 2015/0378581 A1 | 12/2015 | Dietz |
| 2015/0379475 A1 | 12/2015 | Dietz |
| 2016/0057559 A1 | 2/2016 | Deasy et al. |
| 2016/0156547 A1 | 6/2016 | Draluk et al. |
| 2016/0219060 A1 | 7/2016 | Karunakaran et al. |
| 2016/0337844 A1 | 11/2016 | Hailpern |
| 2017/0063839 A1 | 3/2017 | Barton et al. |
| 2017/0244724 A1 | 8/2017 | Deasy et al. |

FOREIGN PATENT DOCUMENTS

| | | |
|---|---|---|
| CN | 1661610 A | 8/2005 |
| CN | 1708751 A | 12/2005 |
| CN | 1713199 A | 12/2005 |
| CN | 1849774 A | 10/2006 |
| CN | 1894897 A | 1/2007 |
| CN | 1951060 A | 4/2007 |
| CN | 101022610 A | 8/2007 |
| CN | 101170401 A | 4/2008 |
| CN | 101217663 A | 7/2008 |
| CN | 101305378 A | 11/2008 |
| CN | 101322379 A | 12/2008 |
| CN | 101350814 A | 1/2009 |
| CN | 101453708 A | 6/2009 |
| CN | 101572678 A | 11/2009 |
| CN | 101588353 A | 11/2009 |
| CN | 101727274 A | 6/2010 |
| CN | 101888597 A | 11/2010 |
| CN | 102422553 A | 4/2012 |
| CN | 102446256 A | 5/2012 |
| CN | 102541635 A | 7/2012 |
| CN | 102591802 A | 7/2012 |
| CN | 102986190 A | 3/2013 |
| CN | 103299658 A | 9/2013 |
| CN | 104854561 A | 8/2015 |
| EP | 1465039 A1 | 10/2004 |
| EP | 2028805 A1 | 2/2009 |
| EP | 2403211 A1 | 1/2012 |
| EP | 2428894 A1 | 3/2012 |
| EP | 2523107 A1 | 11/2012 |
| EP | 2573701 A1 | 3/2013 |
| GB | 2411320 A | 8/2005 |
| GB | 2462442 A | 2/2010 |
| GB | 2478653 A | 9/2011 |
| JP | 11-205380 | 7/1999 |
| JP | 2003-296210 A | 10/2003 |
| JP | 2006-094258 A | 4/2006 |
| JP | 2006155522 A | 6/2006 |
| JP | 2007215201 A | 8/2007 |
| JP | 2008-033751 A | 2/2008 |
| JP | 2008-097419 A | 4/2008 |
| JP | 2008-160753 A | 7/2008 |
| JP | 2008-527574 A | 7/2008 |
| JP | 2009-070073 A | 4/2009 |
| JP | 2009-520409 A | 5/2009 |
| JP | 2009169661 A | 7/2009 |
| JP | 2009-289164 A | 12/2009 |
| JP | 2010-015601 A | 1/2010 |
| JP | 2010-079901 A | 4/2010 |
| JP | 2011-138446 A | 7/2011 |
| JP | 2011-191897 A | 9/2011 |
| JP | 2011-248888 A | 12/2011 |
| JP | 2013-058223 A | 3/2013 |
| KR | 10-0806993 B1 | 2/2008 |
| KR | 2012-0118819 A | 10/2012 |
| KR | 10-2012-0128376 A | 11/2012 |
| WO | 9914652 A1 | 3/1999 |
| WO | 02084460 A2 | 10/2002 |
| WO | 2004107646 A1 | 12/2004 |
| WO | 2006/012612 A1 | 2/2006 |
| WO | 2006136660 A1 | 12/2006 |
| WO | 2007113709 A1 | 10/2007 |
| WO | 2008086611 A1 | 7/2008 |
| WO | 2009021200 A1 | 2/2009 |
| WO | 2009/157493 A1 | 12/2009 |
| WO | 2010054258 A1 | 5/2010 |
| WO | 2010115289 A1 | 10/2010 |
| WO | 2013020177 A1 | 2/2013 |
| WO | 2013054296 A2 | 4/2013 |
| WO | 2013070813 A1 | 5/2013 |
| WO | 2014/032051 A1 | 2/2014 |
| WO | 2014179543 A1 | 11/2014 |
| WO | 2015/023887 A1 | 2/2015 |

OTHER PUBLICATIONS

Mar. 16, 2016—U.S. Notice of Allowance—U.S. Appl. No. 14/106,171.
Mar. 25, 2016—(CN) Office Action—App 201380057326.1.
Mar. 30, 2016—U.S. Final Office Action—U.S. Appl. No. 13/963,739.
May 12, 2016—U.S. Final Office Action—U.S. Appl. No. 14/733,490.
May 13, 2016—U.S. Notice of Allowance—U.S. Appl. No. 13/963,739.
May 20, 2016—U.S. Notice of Allowance—U.S. Appl. No. 14/032,643.
Nov. 1, 2016 (KR) Office Action—App. 10-2012-7001062.
Nov. 10, 2016 (JP) Notification of Reason for Refusal—App. 2016-505457.
Nov. 16, 2016—U.S. Notice of Allowance—U.S. Appl. No. 14/671,351.
Nov. 25, 2016—U.S. Non-final Office Action—U.S. Appl. No. 14/055,038.
Oct. 11, 2016 (WO) International Search Report and Written Opinion—App No. PCT/US2016/039229.
Oct. 14, 2016—(KR) Office Action—App 10-2015-7031149.
Oct. 20, 2016—U.S. Final Office Action—U.S. Appl. No. 14/039,651.
Oct. 25, 2016—U.S. Non-final Office Action—U.S. Appl. No. 15/057,314.
Oct. 26, 2016—U.S. Non-final Office Action—U.S. Appl. No. 14/026,442.

(56) References Cited

OTHER PUBLICATIONS

Oct. 28, 2016 (JP) Notice of Reasons for Refusal—App. 2016-505458.
Sep. 9, 2016—U.S. Non-final Office Action—U.S. Appl. No. 14/876,832.
Apr. 13, 2017—U.S. Final Office Action—U.S. Appl. No. 14/055,038.
Apr. 18, 2017—(CN) Office Action—App 201380063087.0.
Apr. 20, 2017—U.S. Non-final Office Action—U.S. Appl. No. 14/039,651.
Apr. 21, 2017—U.S. Non-final Office Action—U.S. Appl. No. 15/422,761.
Aug. 10, 2017—U.S. Final Office Action—U.S. Appl. No. 14/039,651.
Aug. 18, 2017—U.S. Non-final Office Action—U.S. Appl. No. 15/345,584.
Aug. 22, 2017—U.S. Non-final Office Action—U.S. Appl. No. 15/347,247.
Aug. 24, 2017—U.S. Final Office Action—U.S. Appl. No. 14/025,898.
Aug. 3, 2017—(JP) Office Action—App 2016-512957.
Aug. 30, 2017—U.S. Notice of Allowance—U.S. Appl. No. 15/422,761.
Aug. 31, 2017—U.S. Non-final Office Action—U.S. Appl. No. 14/932,293.
Dec. 14, 2017—U.S. Notice of Allowance—U.S. Appl. No. 15/189,197.
Dec. 15, 2017—U.S. Final Office Action—U.S. Appl. No. 15/345,584.
Dec. 15, 2017—U.S. Non-final Office Action—U.S. Appl. No. 14/876,832.
Dec. 21, 2017—U.S. Notice of Allowance—U.S. Appl. No. 15/347,247.
Dec. 26, 2017—(CN) Notice of First Office Action—App 201380076963.3.
Dec. 4, 2017 (CN) First Office Action—App. 201380076871.5.
Dec. 4, 2017—U.S. Notice of Allowance—U.S. Appl. No. 14/875,450.
Feb. 8, 2017—(CN) First Office Action—App No. 201380064191.1—Eng Trans.
Feb. 21, 2017—(CN) First Chinese Office Action—App. 2013800657267, Machine Eng Tran.
Feb. 23, 2017—U.S. Non-final Office Action—U.S. Appl. No. 14/025,898.
Jan. 11, 2017—U.S. Non-Final Office Action—U.S. Appl. No. 13/963,833.
Jan. 17, 2017—(CN) Office Action—App 201380063467.4.
Jan. 17, 2017—U.S. Final Office Action—U.S. Appl. No. 14/876,832.
Jan. 18, 2017—U.S. Non-final Office Action—U.S. Appl. No. 14/021,227.
Jan. 19, 2017 (JP) Notification of Reasons for Refusal—App. 2016-505456.
Jan. 3, 2017—U.S. Notice of Allowance—U.S. Appl. No. 14/508,245.
Jul. 17, 2017—U.S. Final Office Action—U.S. Appl. No. 14/876,832.
Jul. 27, 2017—U.S. Final Office Action—U.S. Appl. No. 14/021,227.
Dec. 5, 2013 U.S. Office Action—U.S. Appl. No. 14/029,096.
Dec. 6, 2013 U.S. Notice of Allowance—U.S. Appl. No. 14/022,845.
Jan. 2013—Apple Inc., iPad User Guide for iOS 6.1 Software, Chapter 26, Accessibility, pp. 107-108.
Jan. 13, 2013 U.S. Restriction Requirement—U.S. Appl. No. 13/649,076.
Nov. 15, 2013 U.S. Non-Final Office Action—U.S. Appl. No. 14/015,108.
Nov. 22, 2013 U.S. Restriction Requirement—U.S. Appl. No. 13/649,071.
Nov. 26, 2013 (WO) International Search Report and Written Opinion—App. PCT/US2013/060388.
Nov. 6, 2013 U.S. Office Action—U.S. Appl. No. 13/963,825.
Nov. 7, 2013 U.S. Non-final Office Action—U.S. Appl. No. 13/649,063.
Nov. 8, 2013 U.S. Office Action—U.S. Appl. No. 13/963,811.
Oct. 17, 2013 U.S. Office Action—U.S. Appl. No. 13/963,794.
Oct. 25, 2013 U.S. Notice of Allowance—U.S. Appl. No. 13/963,825.
Apr. 4, 2014 (WO) International Search Report and Written Opinion—App. PCT/US2013/063429.
Apr. 11, 2014 U.S. Final Office Action—U.S. Appl. No. 14/015,108.
Apr. 14, 2014 U.S. Notice of Allowance—U.S. Appl. No. 14/032,706.
Apr. 21, 2014 U.S. Final Office Action—U.S. Appl. No. 14/096,380.
Apr. 7, 2014 U.S. Final Office Action—U.S. Appl. No. 14/029,077.
Apr. 8, 2014 U.S. Non-Final Office Action—U.S. Appl. No. 13/886,889.
Aug. 8, 2014—U.S. Notice of Allowance—U.S. Appl. No. 14/032,885.
Aug. 1, 2014 U.S. Notice of Allowance—U.S. Appl. No. 14/041,946.
Aug. 21, 2014 U.S. Final Office Action—U.S. Appl. No. 14/043,301.
Aug. 29, 2014—U.S. Final Office Action—U.S. Appl. No. 13/649,073.
Aug. 29, 2014—U.S. Final Office Action—U.S. Appl. No. 13/649,076.
Aug. 30, 2014 U.S. Notice of Allowance—U.S. Appl. No. 14/029,088.
Aug. 5, 2014 U.S. Notice of Allowance—U.S. Appl. No. 14/029,096.
Aug. 7, 2014 U.S. Final Office Action—U.S. Appl. No. 13/963,851.
Aug. 7, 2014 U.S. Final Office Action—U.S. Appl. No. 14/043,086.
Aug. 7, 2014 U.S. Notice of Allowance—U.S. Appl. No. 14/029,068.
Dec. 19, 2014—U.S. Non-Final Office Action—U.S. Appl. No. 14/043,331.
Dec. 22, 2014—U.S. Non-Final Office Action—U.S. Appl. No. 13/649,069.
Dec. 29, 2014—U.S. Final Office Action—U.S. Appl. No. 13/649,022.
Feb. 4, 2014 (WO) International Search Report and Written Opinion—App. PCT/US2013/064349.
Feb. 6, 2014 (WO) International Search Report and Written Opinion—App. PCT/US2013/064076.
Feb. 10, 2014 U.S. Non-Final Office Action—U.S. Appl. No. 14/96,418.
Feb. 10, 2014 (WO) International Search Report—App PCT/US/2013/065245.
Feb. 24, 2014 U.S. Non-final Office Action—U.S. Appl. No. 13/963,833.
Feb. 24, 2014 U.S. Non-final Office Action—U.S. Appl. No. 14/044,901.
Feb. 24, 2014 U.S. Non-final Office Action—U.S. Appl. No. 13/649,073.
Feb. 24, 2014 (WO) International Search Report and Written Opinion—App PCT/US2013/060379.
Feb. 28, 2014 U.S. Non-final Office Action—U.S. Appl. No. 14/096,380.
Feb. 3, 2014 U.S. Non-Final Office Action—U.S. Appl. No. 14/032,439.
Feb. 3, 2014 U.S. Non-Final Office Action—U.S. Appl. No. 14/044,946.
Feb. 4, 2014 U.S. Non-final Office Action—U.S. Appl. No. 14/032,643.
Jan. 10, 2014 U.S. Non-final Office Action—U.S. Appl. No. 14/032,820.
Jan. 10, 2014 (WO) Written Opinion and International Search Report—App. PCT/US2013/062636.
Jan. 17, 2014 U.S. Non-Final Office Action—U.S. Appl. No. 13/648,993.
Jan. 17, 2014 U.S. Non-final Office Action—U.S. Appl. No. 14/045,005.
Jan. 21, 2014 (WO) International Search Report and Written Opinion in International—App. PCT/US2013/063856.
Jan. 24, 2014 U.S. Non-final Office Action—U.S. Appl. No. 13/963,851.
Oct. 17, 2017—(EP) Examination Report—App 13771691.6-1853.
May 22, 2019 (EP) Extended European Search Report—App. 19152128.5.
May 29, 2019—U.S. Final Office Action—U.S. Appl. No. 15/957,642.
Jun. 3, 2019—U.S. Notice of Allowance—U.S. Appl. No. 15/057,314.
Jun. 13, 2019—U.S. Final Office Action—U.S. Appl. No. 14/055,038.
Jul. 4, 2019 (EP) Extended European Search Report—App. 19168479.4.
Jul. 10, 2019—U.S. Notice of Allowance—U.S. Appl. No. 15/946,692.
Nov. 5, 2015—(EP) Communication Under Rules 61 and 62—App. 13773923.1.
Jan. 7, 2019—(EP) Notice of Allowance—App. 13773923.1.
Aug. 1, 2019—(EP) Extended European Search Report—App. 19172024.2.
May 8, 2014 U.S. Final Office Action—U.S. Appl. No. 14/029,096.
Nov. 5, 2014—U.S. Non-Final Office Action—U.S. Appl. No. 14/045,014.
Nov. 21, 2014—U.S. Non-Final Office Action—U.S. Appl. No. 14/044,946.
Nov. 24, 2014—U.S. Notice of Allowance—U.S. Appl. No. 14/043,301.
Nov. 26, 2014—U.S. Non-Final Office Action—U.S. Appl. No. 13/963,851.
Nov. 5, 2014—U.S. Non-Final Offie Action—U.S. Appl. No. 13/886,765.
Oct. 6, 2014—U.S. Notice of Allowance—U.S. Appl. No. 14/041,911.
Oct. 10, 2014—U.S. Final Office Action—U.S. Appl. No. 14/032,643.
Oct. 20, 2014 (WO) International Search Report—App PCT/US2014/036382.
Oct. 22, 2014—U.S. Non-Final Office Action—U.S. Appl. No. 14/055,078.
Sep. 5, 2014—U.S. Non-Final Office Action—U.S. Appl. No. 13/648,993.

(56) References Cited

OTHER PUBLICATIONS

Sep. 8, 2014—U.S. Final Office Action—U.S. Appl. No. 13/886,889.
Sep. 18, 2014—U.S. Final Office Action—U.S. Appl. No. 13/649,071.
Sep. 26, 2014—U.S. Final Office Action—U.S. Appl. No. 14/044,989.
Sep. 29, 2014 (WO) International Search Report—App PCT/US2014/036326.
Apr. 2, 2015—U.S. Final Office Action—U.S. Appl. No. 14/022,935.
Apr. 6, 2015—U.S. Non-Final Office Action—U.S. Appl. No. 14/039,632.
Apr. 14, 2015—U.S. Notice of Allowance & Fees Due—U.S. Appl. No. 14/043,086.
Apr. 16, 2015—U.S. Notice of Allowance & Fees Due—U.S. Appl. No. 13/886,765.
Aug. 4, 2015—U.S. Non-Final Office Action—U.S. Appl. No. 13/963,739.
Aug. 5, 2015—U.S. Notice of Allowance—U.S. Appl. No. 13/886,765.
Aug. 7, 2015—U.S. Final Office Action—U.S. Appl. No. 14/043,331.
Aug. 14, 2015—U.S. Non-final Office Action—U.S. Appl. No. 14/040,831.
Aug. 14, 2015—U.S. Notice of Allowance—U.S. Appl. No. 14/044,919.
Aug. 17, 2015—U.S. Final Office Action—U.S. Appl. No. 14/039,632.
Aug. 20, 2015—U.S. Non-Final Office Action—U.S. Appl. No. 14/242,011.
Aug. 21, 2015—U.S. Final Office Action—U.S. Appl. No. 14/039,651.
Aug. 24, 2015—U.S. Non-final Office Action—U.S. Appl. No. 14/535,597.
Aug. 26, 2015—U.S. Final Office Action—U.S. Appl. No. 14/027,929.
Dec. 2, 2015—U.S. Non-final Office Action—U.S. Appl. No. 14/021,227.
Dec. 10, 2015—U.S. Final Office Action—U.S. Appl. No. 14/340,096.
Dec. 14, 2015—U.S. Non-final Office Action—U.S. Appl. No. 14/022,935.
Dec. 18, 2015—U.S. Non-final Office Action—U.S. Appl. No. 14/039,632.
Dec. 22, 2015—U.S. Final Office Action—U.S. Appl. No. 14/106,171.
Feb. 12, 2015—U.S. Non-Final Office Action—U.S. Appl. No. 13/963,833.
Feb. 18, 2015—U.S. Non-Final Office Action—U.S. Appl. No. 14/043,229.
Jan. 5, 2015—U.S. Non-Final Office Action—U.S. Appl. No. 13/649,071.
Jan. 5, 2015—U.S. Non-Final Office Action—U.S. Appl. No. 14/027,929.
Jan. 7, 2015—U.S. Notice of Allowance & Fees Due—U.S. Appl. No. 14/045,014.
Jan. 22, 2015 U.S. Notice of Allowance—U.S. Appl. No. 13/963,851.
Jan. 26, 2015—U.S. Non-Final Office Action—U.S. Appl. No. 13/886,889.
Jan. 27, 2015—U.S. Non-Final Office Action—U.S. Appl. No. 13/963,758.
Jul. 8, 2015—U.S. Non-Final Office Action—U.S. Appl. No. 14/340,096.
Jul. 22, 2015—U.S. Notice of Allowance—U.S. Appl. No. 13/963,758.
Jul. 23, 2015—U.S. Non-Final Office Action—U.S. Appl. No. 14/025,898.
Jul. 29, 2015—U.S. Final Office Action—U.S. Appl. No. 13/886,889.
Jul. 6, 2015—U.S. Notice of Allowance—U.S. Appl. No. 13/649,024.
Jul. 9, 2015—U.S. Final Offcie Action—U.S. Appl. No. 13/963,833.
Jun. 5, 2015—U.S. Final Office Action—U.S. Appl. No. 13/649,071.
Jan. 24, 2014 U.S. Non-final Office Action—U.S. Appl. No. 14/041,935.
Jan. 30, 2014 U.S. Non-final Office Action—U.S. Appl. No. 14/045,014.
Jan. 6, 2014 U.S. Non-final Office Action—U.S. Appl. No. 14/043,229.
Jan. 9, 2014 U.S. Non-final Office Action—U.S. Appl. No. 14/032,756.
Jul. 10, 2014 U.S. Notice of Allowance—U.S. Appl. No. 14/044,972.
Jul. 11, 2014 (WO) International Search Report and Written Opinion—App PCT/US2013/63261.
Jul. 11, 2014—U.S. Non-Final Office Action—U.S. Appl. No. 13/649,024.
Jul. 17, 2014—U.S. Non-Final Office Action—U.S. Appl. No. 13/649,022.
Jul. 18, 2014 U.S. Final Office Action—U.S. Appl. No. 13/963,833.
Jul. 21, 2014 U.S. Notice of Allowance—U.S. Appl. No. 14/043,012.
Jul. 24, 2014 U.S. Final Office Action—U.S. Appl. No. 14/032,643.
Jul. 28, 2014 U.S. Final Office Action—U.S. Appl. No. 13/649,069.
Jul. 29, 2014 U.S. Notice of Allowance—U.S. Appl. No. 11/043,164.
Jul. 3, 2014 U.S. Final Office Action—U.S. Appl. No. 14/045,014.
Jul. 9, 2014 U.S. Notice of Allowance—U.S. Appl. No. 13/649,064.
Jun. 2, 2014 U.S. Notice of Allowance—U.S. Appl. No. 14/032,756.
Jun. 23, 2014 U.S. Final Office Action—U.S. Appl. No. 14/044,946.
Jun. 24, 2014 U.S. Final Office Action—U.S. Appl. No. 14/043,229.
Jun. 24, 2014 U.S. Notice of Allowance—U.S. Appl. No. 13/649,063.
Jun. 26, 2014 U.S. Notice of Allowance—U.S. Appl. No. 14/042,941.
Jun. 3, 2014 (WO) International Search Report and Written Opinion—App. PCT/US2013/060047.
Jun. 4, 2014 U.S. Final Office Action—U.S. Appl. No. 14/032,820.
Jun. 4, 2014 U.S. Notice of Allowance—U.S. Appl. No. 14/032,439.
Jun. 6, 2014 U.S. Final Office Action—U.S. Appl. No. 14/032,885.
Mar. 17, 2014 (WO) International Search Report and Written Opinion—App. PCT/US2013/064279.
Mar. 18, 2014 U.S. Non-Final Office Action—U.S. Appl. No. 13/649,064.
Mar. 20, 2014 U.S. Non-Final Office Action—U.S. Appl. No. 13/649,071.
Mar. 25, 2014 U.S. Non-Final Office Action—U.S. Appl. No. 14/043,086.
Mar. 27, 2014 U.S. Final Office Action—U.S. Appl. No. 13/963,758.
Mar. 27, 2014 U.S. Non-final Office Action—U.S. Appl. No. 13/649,069.
Mar. 28, 2014 U.S. Final Office Action—U.S. Appl. No. 14/022,935.
Mar. 6, 2014 U.S. Non-Final Office Action—U.S. Appl. No. 14/041,946.
Mar. 6, 2014 (WO) International Search Report and Written Opinion in International Application No. PCT/US2013/064319.
May 16, 2014 U.S. Final Office Action—U.S. Appl. No. 14/044,998.
May 16, 2014 U.S. Final Office Action—U.S. Appl. No. 14/096,418.
May 19, 2014 U.S. Non-Final Office Action—U.S. Appl. No. 13/649,076.
May 19, 2014 U.S. Notice of Allowance—U.S. Appl. No. 14/044,901.
May 2, 2014 U.S. Non-Final Office Action—U.S. Appl. No. 14/044,972.
May 20, 2014 U.S. Non-Final Office Action—U.S. Appl. No. 14/044,989.
May 27, 2014 U.S. Notice of Allowance—U.S. Appl. No. 14/015,245.
May 27, 2014 U.S. Notice of Allowance—U.S. Appl. No. 14/042,984.
May 29, 2014 U.S. Final Office Action—U.S. Appl. No. 14/041,911.
May 29, 2014 U.S. Notice of Allowance—U.S. Appl. No. 14/043,343.
May 5, 2014 U.S. Notice of Allowance—U.S. Appl. No. 14/044,928.
May 7, 2014 U.S. Final Office Action—U.S. Appl. No. 14/029,068.
May 7, 2014 U.S. Final Office Action—U.S. Appl. No. 14/029,088.
Barr et al, ; The VMware mobile virtualization platform: is that a hypervisor in you pocket? Published in: Newsletter ACM SIGOPS Operatng Systems Review archive; vol. 44 Issue 4, Dec. 2010; pp. 124-135; ACM Digital Library (Year: 2010).
Potega; Advanced Infrared (AIR): Intra-cabin wireless data netwok; Published in: 17th DASC. AAA/IEEE/SAE. Digital Avionics Systems Conference, proceedings (Cat, No,98CH36267); Date of Conference: Oct. 31-Nov. 7, 1998; IEEE Xplore (Year: 1998).
Feb. 18, 2019 (EP)—Search Report App 18196098.
May 3, 2019 (EP) Examination Report—App. 13780486.0.
Sep. 20, 2018—U.S. Final Office Action—U.S. Appl. No. 14/021,227.
Sep. 21, 2018—U.S. Non-final Office Action—U.S. Appl. No. 14/876,832.
Feb. 8, 2019—(EP) Examination Report—App 13 779 976.3.
Jan. 10, 2019—(JP) Notification of Reasons for Refusal—App 2017-550935, Eng Tran.
Jan. 11, 2019—U.S. Final Office Action—U.S. Appl. No. 15/946,692.
Jan. 14, 2019—U.S. Notice of Allowance—U.S. Appl. No. 14/021,227.
General review of latest approaches for BYOD Safely use business apps from personal terminal, Nikkei Communication, Nikkei Business Publications, Inc., Jun. 1, 2012, No. 581, pp. 27-37.
Hana K. Rubinsztejn et al., "Support for Context-Aware Collaboration," in "Serious Games," Jan. 1, 2004 , Springer International Publishing, Cham, XP055522503, ISSN: 0302-9743, ISBN: 978-3-030-02761-2, vol. 3284, pp. 37-47, 2004.

(56) References Cited

OTHER PUBLICATIONS

Ikuki Matsuhisa, Telecommunication, RIC TELECOM, Sep. 25, 2011, vol. 28, No. 10, p. 66-69.
Notification of Concurrently Filed Applications in 1 page.
Symantec: "What are Managed Applications and What is the Difference Between Assigned and Published;" Jan. 7, 2002; pp. 1-5.
Tilakgovind: "Understanding the Difference Between .exe and .msi: Symantec Connect" Jan. 15, 2008.
Vejda et al. "Towards Trust Services for Language-Based Virtual Machines for Grid Computing", Graze University of Technology, (Mar. 11, 2008), pp. 48-59.
Jun. 9, 2015—U.S. Notice of Allowance—U.S. Appl. No. 14/043,229.
Jun. 15, 2015—U.S. Non-Final Office Action—U.S. Appl. No. 13/649,076.
Jun. 17, 2015—U.S. Notice of Allowance—U.S. Appl. No. 14/055,078.
Jun. 18, 2015—U.S. Non-Final Office Action—U.S. Appl. No. 14/043,902.
Jun. 23, 2015—U.S. Notice of Allowance—U.S. Appl. No. 14/043,229.
Mar. 25, 2015—U.S. Non-Final Office Action—U.S. Appl. No. 14/044,919.
Mar. 26, 2015—U.S. Non-Final Office Action—U.S. Appl. No. 14/055,038.
Mar. 5, 2015—U.S. Non-Final Office Action—U.S. Appl. No. 14/039,651.
May 19, 2015—U.S. Notice of Allowance & Fees Due—U.S. Appl. No. 13/648,993.
May 20, 2015—U.S. Notice of Allowance & Fees Due—U.S. Appl. No. 13/649,022.
May 20, 2015—U.S. Notice of Allowance & Fees Due—U.S. Appl. No. 13/649,069.
May 22, 2015—U.S. Non-Final Office Action—U.S. Appl. No. 14/106,171.
Nov. 5, 2015—(EP) Office Action—App 13773923.1.
Nov. 12, 2015—U.S. Final Office Action—U.S. Appl. No. 14/055,038.
Nov. 13, 2015 (WO) International Search Report and Written Opinion—App. PCT/US2015/026781.
Nov. 23, 2015—U.S. Non-final Office Action—U.S. Appl. No. 14/032,643.
Nov. 3, 2015—U.S. Non-Final Office Action—U.S. Appl. No. 14/733,490.
Oct. 9, 2015—U.S. Notice of Allowance—U.S. Appl. No. 13/886,889.
Oct. 28, 2015—U.S. Notice of Allowance—U.S. Appl. No. 13/886,889.
Oct. 8, 2015—U.S. Final Office Action—U.S. Appl. No. 14/015,194.
Oct. 9, 2015—U.S. Final Office Action—U.S. Appl. No. 14/043,902.
Sep. 2, 2015—U.S. Notice of Allowance—U.S. Appl. No. 13/649,071.
Sep. 22, 2016—U.S. Non-final Office Action—U.S. Appl. No. 14/607,593.
Apr. 25, 2016—U.S. Non-final Office Action—U.S. Appl. No. 14/508,245.
Apr. 4, 2016—U.S. Notice of Allowance—U.S. Appl. No. 14/607,593.
Apr. 7, 2016—U.S. Non-final Office Action—U.S. Appl. No. 14/340,096.
Apr. 8, 2016—U.S. Non-final Office Action—U.S. Appl. No. 14/671,351.
Aug. 11, 2016—U.S. Notice of Allowance—U.S. Appl. No. 14/340,096.
Aug. 17, 2016—U.S. Non-Final Office Action—U.S. Appl. No. 14/733,490.
Aug. 2, 2016—U.S. Notice of Allowance—U.S. Appl. No. 14/535,597.
Aug. 23, 2016—U.S. Notice of Allowance—U.S. Appl. No. 13/649,073.
Aug. 8, 2016—U.S. Final Office Action—U.S. Appl. No. 14/022,935.
Dec. 2, 2016—U.S. Notice of Allowance—U.S. Appl. No. 14/607,593.
Feb. 3, 2016—U.S. Notice of Allowance—U.S. Appl. No. 14/040,831.
Feb. 23, 2016—U.S. Non-Final Office Action—U.S. Appl. No. 14/039,651.
Feb. 24, 2016—U.S. Notice of Allowance—U.S. Appl. No. 14/015,194.
Feb. 29, 2016—U.S. Ex pane Quayle—U.S. Appl. No. 14/242,011.
Feb. 29, 2016—U.S. Notice of Allowance—U.S. Appl. No. 13/649,076.
Jan. 21, 2016—U.S. Non-final Office Action—U.S. Appl. No. 13/649,073.
Jul. 12, 2016—U.S. Final Office Action—U.S. Appl. No. 14/021,277.
Jul. 15, 2016—U.S. Non-final Office Action—U.S. Appl. No. 14/932,293.
Jul. 27, 2016—U.S. Notice of Allowance—U.S. Appl. No. 14/607,593.
Jul. 28, 2016—U.S. Non-final Office Action—U.S. Appl. No. 14/055,038.
Jul. 29, 2016 (KR) Office Action—App. 10-2015-7031152.
Jul. 7, 2016—(EP) Supplementary European Search Report—App 13795317.0.
Jun. 20, 2016—(EP) Extended European Search Report—App 13795317.
Jun. 22, 2016—U.S. Final Office Action—U.S. Appl. No. 13/963,833.
Jun. 22, 2016—U.S. Final Office Action—U.S. Appl. No. 14/025,898.
Jun. 30, 2016—U.S. Non-final Office Action—U.S. Appl. No. 14/752,132.
1998—Peine, H., "Security concepts and implementation in the Ara mobile agent system," [Online] 1998, Enabling Technologies: Infrastructure for Collaborative Enterprises, Seventh IEEE International Workshops on Jun. 17-19, 1998, [Retrieved from the Internet] <http://ieeexplore.ieee.org/stamp/stamp.jsp?tp=&arnumber=725699&isnumber=15665> pp. 236-242.
Nov./Dec. 1999—"Conflicts in Policy-Based Distributed Systems Management," Lupu, Emil et al., pp. 852-869.
Mar./Apr. 2002—"Simplifying Network Administration Using Policy-Based Management," Verma, Dinesh C. et al.
2003—Mysore et al., "The Liquid Media System—a Multi-Device Streaming Media Orchestration Framework", Ubicomp Workshop, pp. 1-4.
2003—Wilson et al., "Unified Security Framework", In proceedings of the 1st International Symposium on Information and Communication Technologies, pp. 500-505. Trinity College Dublin.
Apr. 28, 2003—Kate Gregory: "Managed, Unmanaged, Native: What Kind of Code is This?", Developer.com, pp. 1-3, XP055096991, retrieved from the Internet: <URL:http://www.developer.com/print.php/2197621>, [retrieved on Jan. 17, 2014], the whole document.
Sep. 2003—"Securing wireless access to mobile applications," Phifer.
2004—"Policy Transformation Techniques in Policy-based Systems Management," Beigi, Mandis S., et al., pp. 1-10.
Nov. 2004—Skarmeta, A. et al., "Policy-based dynamic provision of IP services in a secure VPN coalition scenario," in IEEE Communications Magazine, vol. 42, No. 11, pp. 118-124.
2005—Hamed, H. et al., " Modeling and verification of IPSec and VPN security policies," 13th IEEE International Conference on Network Protocols (ICNP'05), pp. 10.
Dec. 13, 2005—Lowe, "Application-Specific VPNs".
Oct. 2005—"Policy-Based Management of Networked Computing Systems," Agrawal, Dakshi et al., pp. 69-75.
2006—"Middleware Support for Auditing Service Process Flows," Hacigumus, Hakan, pp. 24-29.
2006—Shah et al., "Securing Java-Based Mobile Agents through Byte Code Obfuscation Techniques," [Online] Dec. 23-24, 2006, Multitopic Conference, 2006, INMIC '06. IEEE, [Retrieved from the Internet] <http://ieeexplore.ieee.org/stamp/stamp.jsp?tp=&arnumber=4196425&isnumber=414013> pp. 305-308.
2007—Symantec Network Access Control Enforcer Implementation Guide; Retrieved from the Internet <URL:ftp.symantec.com/public/english_us_canada/products/symantec_network_access_control/11.0/manuals/enforcer_implementation_guide.pdf>; pp. 1-132.
2008—Administration Guide for Symantec Endpoint Protection and Symantec Network Access Control; Retrieved from the Internet <<URL:ftp.symantec.com/public/english_us_canada/products/symantec_endpoint_protection/11.0/manuals/administration_guide.pdf>; pp. 1-615.
Mar. 11. 2008—Vejda, T. et al., "Towards Trust Services for Language-Based Virtual Machines for Grid Computing," Trusted Computing—Challenges and Applications, ISBN: 978-3-540-68978-2.
2009—"Policy-Based Security Configuration Management Application to Intrusion Dection and Prevention," Alsubhi, Khalid et al., pp. 1-6.
Jan. 12, 2009—"Safeguarding removable-media devices," Sever.
2010—Na et al., "Personal Cloud Computing Security Framework," 2010 IEEE Asia-Pacific Computing Conference, pp. 671-675.

(56) References Cited

OTHER PUBLICATIONS

Oct. 25, 2010—Andreas, "Digging into the Exchange ActiveSync Protocol," Mobility Dojo.net, http://mobilitydojo.net/2010/03/17/digging-into-the-exchange-activesync-protocol/.
2011—Laverty, Joseph Packy et al., "Comparative Analysis of Mobile Application Development and Security Models," Issues in Information Systems vol. XII, No. 1, [Retrieved from the Internet] <http://iacis.org/iis/2011/301-312_AL2011_1694.pdf> pp. 301-312.
Aug. 25, 2011—"A mobile and portable trusted computing platform," Nepal et al.
Jul. 1, 2011—Wright et al., "Your Firm's Mobile Devices: Flow Secure are They?" Journal of Corporate Accounting and Finance, Willey Periodicals. pp. 13-21.
2012—Potharaju, Rahul et al., "Plagiarizing smartphone applications: attack strategies and defense techniques," [Online] Engineering Secure Software and Systems, Springer Berlin Heidelberg, [Retrieved from the Internet] <http://link.springer.com/chapter/10.1007/978-3-642-28166-2_11#> pp. 106-120.
2012—Ranjan et al., "Programming Cloud Resource Orchestration Framework: Operations and Research Challenges", arvix.org, pp. 1-19.
Apr. 2012—Xuetao Wei, et al., "Malicious Android Applications in the Enterprise: What Do They Do and How Do We Fix It?,"? ICDE Workshop on Secure Data Management on Smartphones and Mobiles, 4 pages.
Aug. 1, 2012—"TPS Development Using the Microsoft .NET Framework", Teresa P. Lopes, IEEE Instrumentation & Measurement Magazine (vol. 15, No. 4).
Jul. 31, 2012—"Citrix XenMobile Technology Overview: White Paper," Citrix White Papers online, pp. 1-14; retrieved from http://insight.com/content/aam/insight/en_US/pdfs/citrix/xenmobile-tech-overview.pdf, retrieved Jan. 27, 2014.
Dec. 10, 2013 U.S. Non-final Office Action—U.S. Appl. No. 14/015,245.
Dec. 16, 2013 U.S. Office Action—U.S. Appl. No. 14/041,911.
Dec. 18, 2013 U.S. Non-final Office Action—U.S. Appl. No. 14/044,928.
Dec. 19, 2013 U.S. Non-final Office Action—U.S. Appl. No. 13/963,758.
Dec. 19, 2013 U.S. Non-Final Office Action—U.S. Appl. No. 14/032,706.
Dec. 19, 2013 U.S. Non-Final Office Action—U.S. Appl. No. 14/032,885.
Dec. 19, 2013 U.S. Office Action—U.S. Appl. No. 14/029,077.
Dec. 19, 2013 U.S. Restriction Requirement—U.S. Appl. No. 13/963,833.
Dec. 20, 2013 U.S. Non-Final Office Action—U.S. Appl. No. 14/043,301.
Dec. 20, 2013 U.S. Non-Final Office Action—U.S. Appl. No. 14/044,998.
Dec. 20, 2013 (WO) International Search Report and Written Opinion—App PCT/US2013/063363.
Dec. 23, 2013 U.S. Notice of Allowance—U.S. Appl. No. 14/041,923.
Dec. 23, 2013 U.S. Non-Final Office Action—U.S. Appl. No. 14/043,343.
Dec. 24, 2013 U.S. Non-final Office Action—U.S. Appl. No. 14/022,935.
Dec. 27, 2013 U.S. Non-Final Office Action—U.S. Appl. No. 14/043,012.
Dec. 27, 2013 U.S. Non-Final Office Action—U.S. Appl. No. 14/042,941.
Dec. 30, 2013 U.S. Non-Final Office Action—U.S. Appl. No. 14/043,164.
Dec. 31, 2013 U.S. Non-Final Office Action—U.S. Appl. No. 14/042,984.
Dec. 5, 2013 U.S. Office Action—U.S. Appl. No. 14/029,068.
Dec. 5, 2013 U.S. Office Action—U.S. Appl. No. 14/029,088.
Mar. 20, 2019 (KR)—Decision to Grant—App. 10-2017-7010876.
Jul. 7, 2017—U.S. Non-final Office Action—U.S. Appl. No. 14/875,450.
Jul. 3, 2017—(CN) Second Office Action—App 2013800641911.
Jun. 1, 2017—U.S. Final Office Action—U.S. Appl. No. 13/963,833.
Jun. 5, 2017—U.S. Non-Final Office Action—U.S. Appl. No. 14/733,490.
Jun. 9, 2017—(CN) First Office Action—App 2013800627647.
Jun. 28, 2017—U.S. Final Office Action—U.S. Appl. No. 14/752,132.
Jun. 14, 2017 (KR) Korean Intellectual Property Office Notice to Submit a Response—App. 10-2015-7031148.
Mar. 3, 2017—(CN) First Office Action—App 201380065897X.
Mar. 3, 2017—(CN) Second Office Action—App 2014800364260.
Mar. 2, 2017—U.S. Final Office Action—U.S. Appl. No. 14/733,490.
May 19, 2017—U.S. Notice of Allowance and Fee(s) Due—U.S. Appl. No. 14/026,442.
May 22, 2017—U.S. Final Office Action—U.S. Appl. No. 15/057,314.
May 24, 2017—U.S. Non-final Office Action—U.S. Appl. No. 14/932,293.
May 3, 2017 (CN) Decision of Rejection—App 2013800573261.
May 31, 2017 (CN) First Office Action—App. 201380077065.X.
Nov. 13, 2017—(CN) Decision of Rejection—App No. 2013800641911.
Nov. 30, 2017—(JP) Notification of Reasons for Refusal—App 2016-226192.
Oct. 3, 2017—U.S. Non-final Office Action—U.S. Appl. No. 15/057,314.
Sep. 14, 2017—U.S. Notice of Allowance—U.S. Appl. No. 14/733,490.
Sep. 22, 2017—U.S. Non-final Office Action—U.S. Appl. No. 14/055,038.
Apr. 19, 2018—U.S. Non-final Office Action—U.S. Appl. No. 15/863,853.
Apr. 5, 2018—U.S. Final Office Action—U.S. Appl. No. 14/876,832.
Aug. 2, 2018 (JP) Decision to Grant—App. 2017-081340.
Aug. 2, 2018 (JP) Notification of Reasons for Refusal—App. 2017-098391.
Feb. 5, 2018—(EP)—Examination Report—App 13795021.8.
Feb. 7, 2018—(CN) Reexamination Decision—App 2013800573261.
Jan. 11, 2018—U.S. Notice of Allowance—U.S. Appl. No. 14/752,132.
Jan. 22, 2018—U.S. Final Office Action—U.S. Appl. No. 14/932,293.
Jan. 25, 2018—(EP) Examination Report—App 13795317.0.
Jan. 25, 2018—U.S. Notice of Allowance—U.S. Appl. No. 14/025,898.
Jan. 31, 2018 (EP) Examination Report—App. 13780489.4.
Jul. 23, 2018—(EP) Examination Report—App 13779976.3.
Jun. 28, 2018—U.S. Non-final Office Action—U.S. Appl. No. 15/946,692.
Jun. 8, 2018—U.S. Notice of Allowance—U.S. Appl. No. 15/140,683.
Jun. 7, 2018—(JP) Decision of Refusal—App. 2016-226192.
Mar. 27, 2018—U.S. Final Office Action—U.S. Appl. No. 15/057,314.
Mar. 30, 2018—U.S. Final Office Aciton—U.S. Appl. No. 14/055,038.
Mar. 9, 2018—U.S. Non-final Office Action—U.S. Appl. No. 14/021,227.
Nov. 12, 2018 (KR) Office Action—App. 10-2017-7022571.
Nov. 26, 2018 (EP)—Search Report—App 18186906.6.
Nov. 27, 2018 (EP)—Search Report—App. 18186904.1.
Nov. 29, 2018—(EP) Summons to Attend Oral Proceedings—App. 13795317.0.
Nov. 29, 2018—U.S. Non-final Office Action—U.S. Appl. No. 14/055,038.
Oct. 23, 2018 (EP) Extended European Search Report and Written Opinion—App. 18185793.9.
Oct. 25, 2018—U.S. Non-final Office Action—U.S. Appl. No. 15/957,642.
Oct. 8, 2018 (EP) Examination Report—App. 13780486.0.
Sep. 14, 2018—U.S. Non-final Office Action—U.S. Appl. No. 15/057,314.
Nov. 25, 2019—U.S. Non-final Office Action—U.S. Appl. No. 14/876,832.
Dec. 23, 2018—U.S. Final Office Action—U.S. Appl. No. 16/401,588.
Jan. 9, 2020—U.S. Non-final Office Action—U.S. Appl. No. 15/960,868.
Sep. 19, 2019 (IN) First Examination Report—App. 2158/CHENP/2015.
Sep. 26, 2019—U.S. Final Office Action—U.S. Appl. No. 15/960,868.
Sep. 30, 2019—U.S. Notice of Allowance—U.S. Appl. No. 15/957,642.
Sep. 12, 2019—(JP) Notice of Allowance—App 2017-550935.
Oct. 1, 2019—(EP) Notice of Allowance—App 15722806.5.

(56) References Cited

OTHER PUBLICATIONS

Nov. 25, 2019—(IN) Examination Report—App No. 6632/CHEN/2015.
Yoshio Itaya, Windows & Linux, Book for complete understanding of dual boot, Sotec Ltd., May 15, 2009, First edition, p. 14 (documents presenting a well-known technique).
Dynamic control technique of smart device based on policy, NTT Technical Journal, The Telecommunications Association, Oct. 1, 2012, vol. 24, No. 10, pp. 42.45.
Dec. 11, 2019—(JP) Decision of Refusal—App 2018-189820.
International Search Report received in PCT/US2014/036326 dated Sep. 29, 2014.
Dec. 30, 2019—(CN) Office Action—App 201710937723.8.
Jan. 23, 2020 (IN) First Examination Report—App. 6625/CHENP/2015.
Jan. 24, 2020 (EP) Examination Report (Communication pursuant to Article 94(3))—App. 19152128.5.
Sep. 25, 2019 (EP) Communication pursuant to Article 94(3) EPC—App. 18185793.9.
Oct. 24, 2019 (IN) First Examination Report—App. 2601/CHENP/2015.
Oct. 29, 2019 (IN) First Examination Report—App. 6657/CHENP/2015.
Nov. 29, 2019—(IN) Examination Report—App 2751/CHENP/2015.
Jan. 31, 2020 (IN) First Examination Report—App. 6626/CHENP/2015.
Dec. 31, 2019—(IN) Examination Report—App 2698/CHENP/2015.
Feb. 20, 2020—U.S. Notice of Allowance—U.S. Appl. No. 16/567,238.
May 5, 2020 U.S. Advisory Action—U.S. Appl. No. 16/401,588.
May 26, 2020—U.S. Non-final Office Action—U.S. Appl. No. 14/055,038.
Jun. 9, 2020—U.S. Final Office Action—U.S. Appl. No. 15/960,868.
Jun. 23, 2020—U.S. Non-final Office Action—U.S. Appl. No. 16/401,588.
Jun. 23, 2020 (EP) Examination Report—App. 18186906.6.
Jun. 17, 2020 (EP) Examination Report—App EP18186904.1.
Jul. 21, 2020 (EP) Extended European Search Report—App. 20179037.5.
Sep. 15, 2020—U.S. Final Office Action—U.S. Appl. No. 16/111,328.
Sep. 30, 2020—U.S. Notice of Allowance—U.S. Appl. No. 16/519,243.
Nov. 3, 2020 (CN) First Office Action—App. 201810705279.9.

* cited by examiner

DATA MANAGEMENT FOR AN APPLICATION WITH MULTIPLE OPERATION MODES

CROSS-REFERENCE TO RELATED APPLICATIONS

This application is a continuation of non-provisional application Ser. No. 14/021,227, filed on Sep. 9, 2013, entitled, "Data Management For An Application With Multiple Operation Modes," which claims priority to provisional application 61/861,736, filed Aug. 2, 2013, entitled "Policy-Based Application Management," provisional application 61/861,758, filed Aug. 2, 2013, entitled "Data Management for an Application with Multiple Operation Modes," and provisional application 61/806,577, filed Mar. 29, 2013, entitled "Systems and Methods for Enterprise Mobility Management," and is a continuation-in-part of U.S. patent application Ser. No. 13/886,889, filed May 2, 2013, entitled "Application with Multiple Operation Modes," each of which is herein incorporated by reference in its entirety.

BACKGROUND

The use of mobile computing devices continues to grow. In particular, business and other enterprises have come to rely on mobile computing devices to allow individuals to remotely access various enterprise resources. Such resources may include, for example, electronic mail services, file services, data, and other electronic resources provided by the computer systems of an enterprise.

With this insurgence of business use, individuals are beginning to use their mobile computing devices in both business and personal ways. For example, an employee of a corporation may access a corporate email account and a personal email account from the same mobile computing device. Accordingly, certain functionality of a mobile computing device may share business and personal aspects. However, business information often requires secure communication and storage. Additionally, business information stored on a mobile device may require management. Thus, there is a need for a device manager to manage information stored on a mobile device.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

A method and system for managing an application with multiple operation modes are described herein. A device manager that manages a mobile device may monitor the mobile device. The device manager may detect that a predetermined type of application that runs in an unmanaged mode and a managed mode is installed on the mobile device. The operation mode may be based on a device context or device-related information. For example, the application may run in a first, managed, mode when user credentials authenticate a user as a trusted user, and the application may otherwise run in a second less-secure mode. Operational mode may also be selected based on a physical location of the device, a network location, user credentials, user roles, location types (e.g., healthcare, financial institution premises, schools, government entities, etc., also referred to as workplace environment types), and the like. An application may be executable in more than two operation modes, and may be executable in multiple different managed modes providing different levels of access, security, resources, etc.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards controlling remote access to resources at an enterprise computing system using managed mobile applications at mobile computing devices, specifically as used with applications capable of executing in multiple operational modes. An access manager may perform a validation process that determines whether a mobile application requesting access to enterprise resources has accurately identified itself and has not been subsequently altered after installation at the mobile computing device. In this way, the access manager may ensure the mobile application requesting access to the enterprise resource can be trusted and are not attempting to circumvent the security mechanisms used to protect those enterprise resources. As a result, individuals associated with the enterprise may advantageously utilize enterprise resources at their personal mobile devices using preapproved applications.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Figure 1:
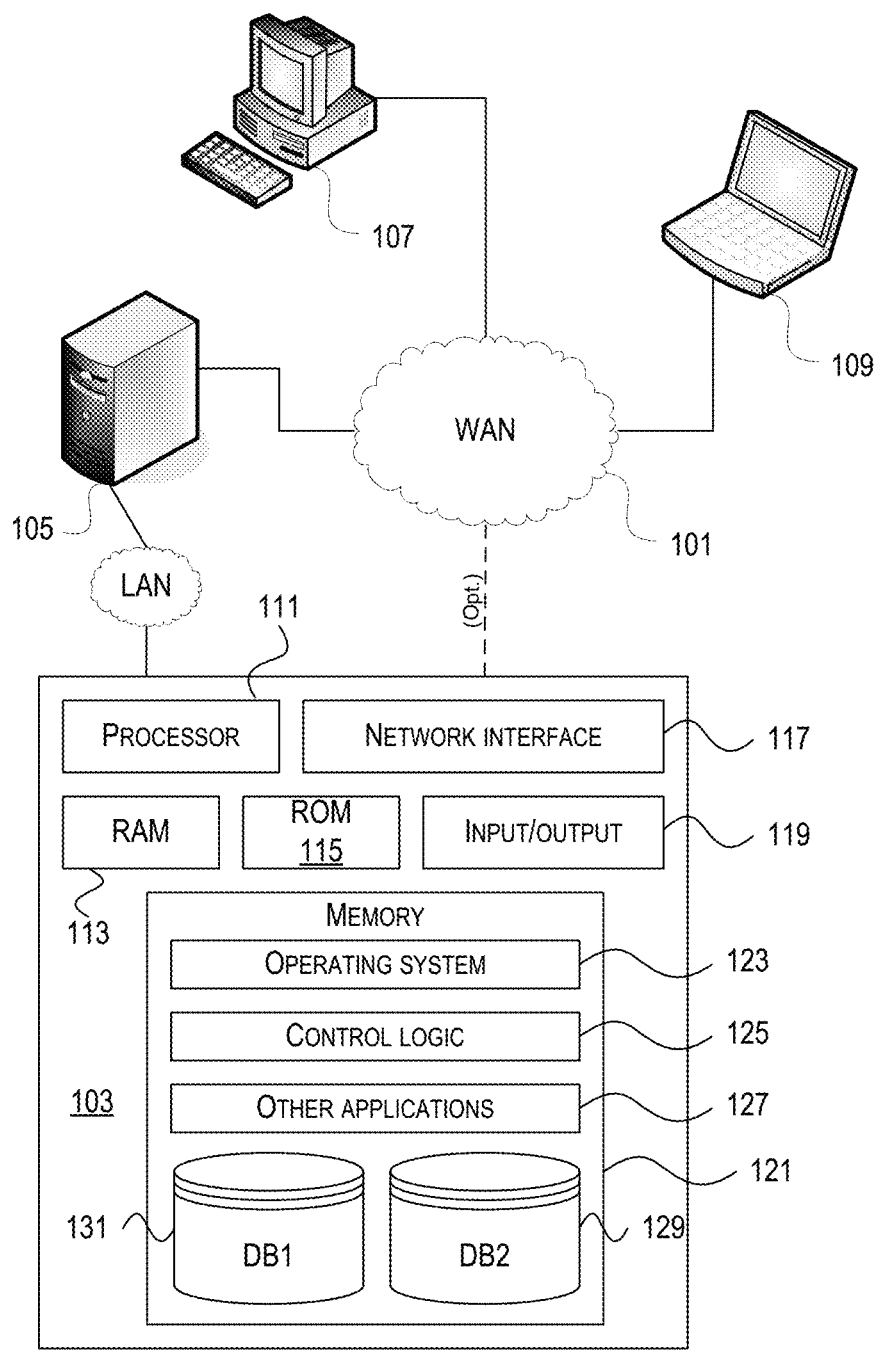
FIG. 1 depicts an illustrative computer system architecture that may be used in accordance with an illustrative embodiment.

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, LANs, metropolitan area networks (MAN) wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
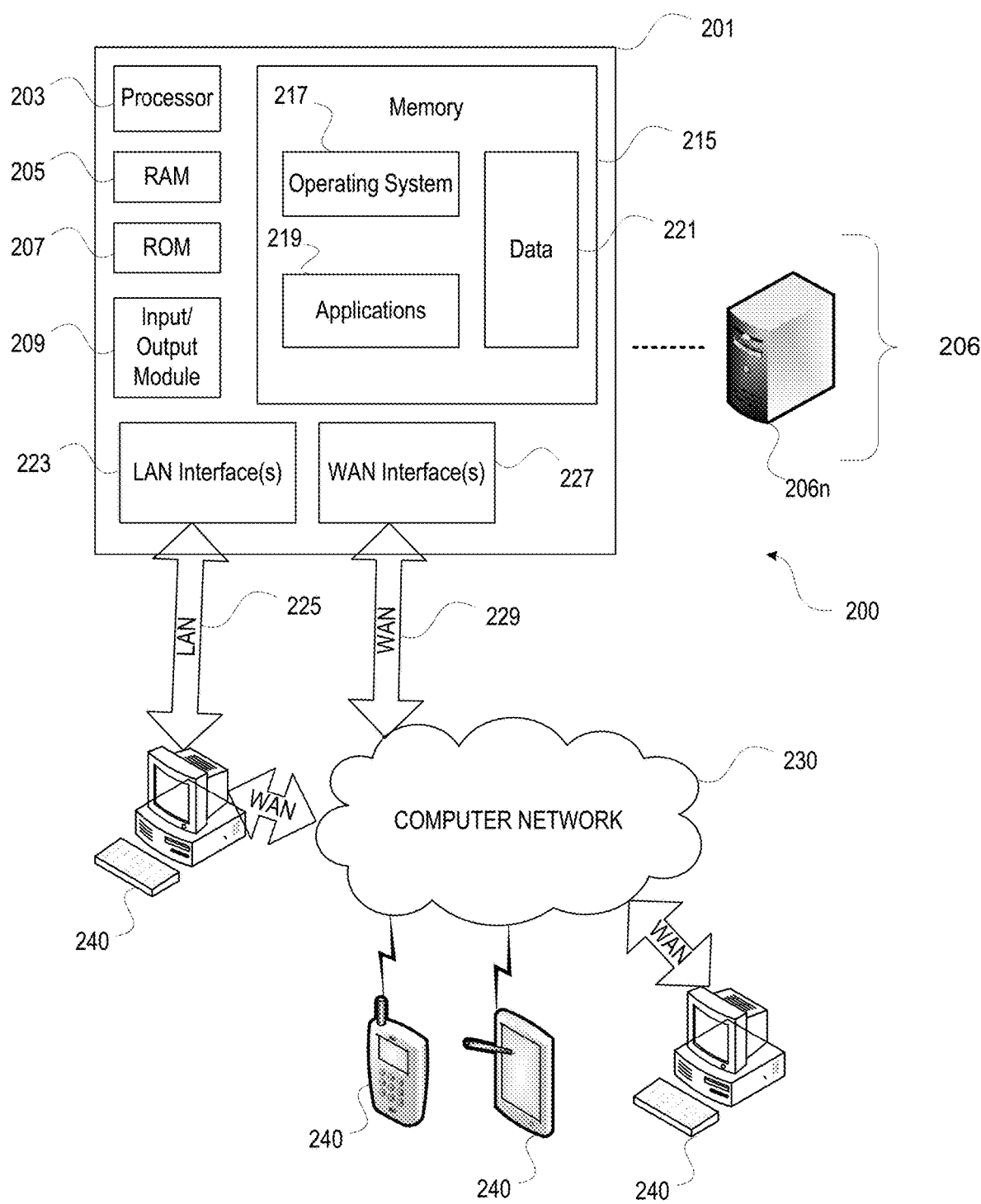
FIG. 2 depicts an illustrative remote-access system architecture that may be used in accordance with an illustrative embodiment.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 106a that receives requests from a client machine 240, forwards the request to a second server 106b, and responds to the request generated by the client machine 240 with a response from the second server 106b. First server 106a may acquire an enumeration of applications available to the client machine 240 and well as address information associated with an application server 206 hosting an application identified within the enumeration of applications. First server 106a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

Figure 3:
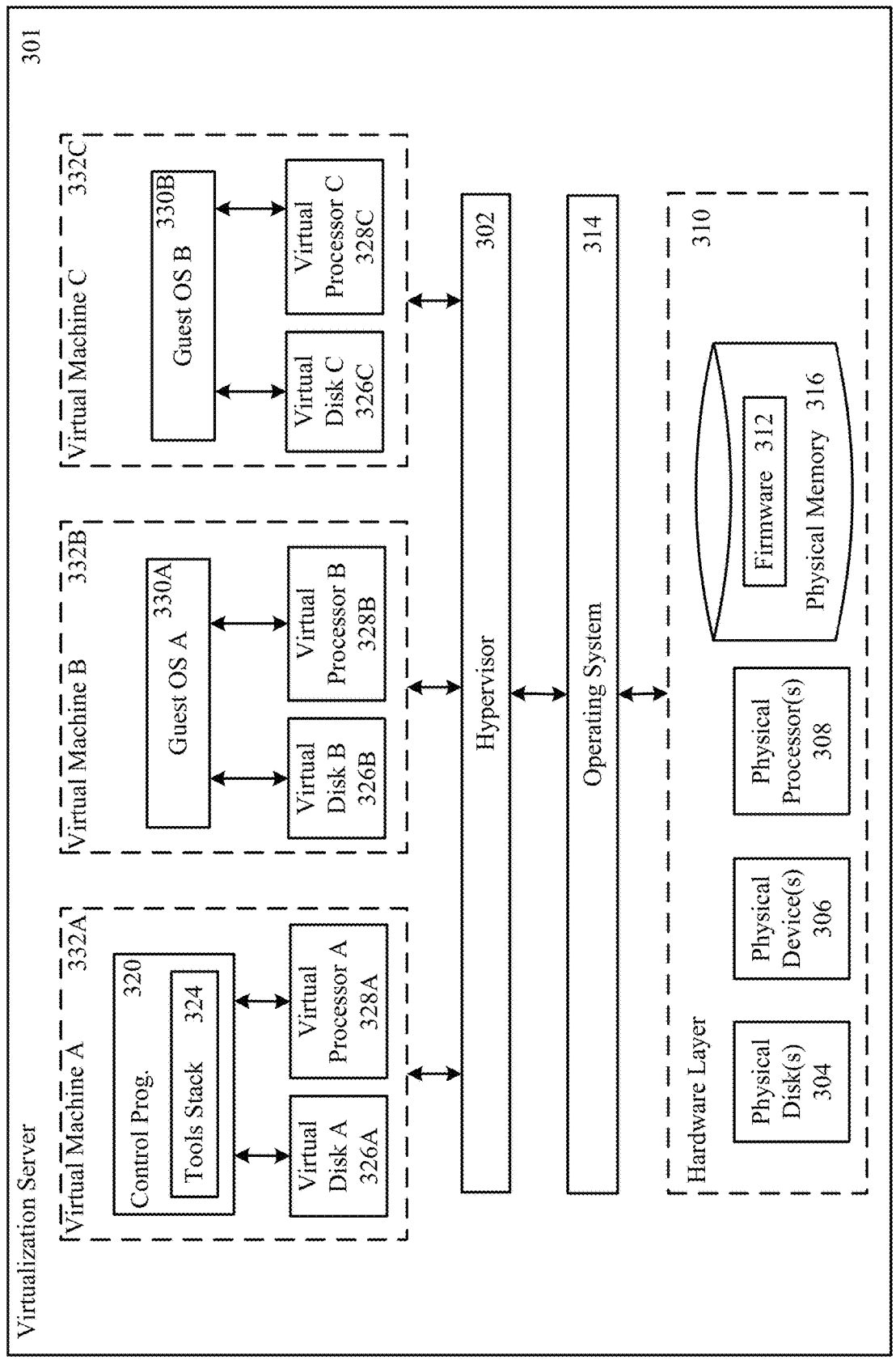
FIG. 3 depicts an illustrative virtualized (hypervisor) system architecture that may be used in accordance with an illustrative embodiment.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
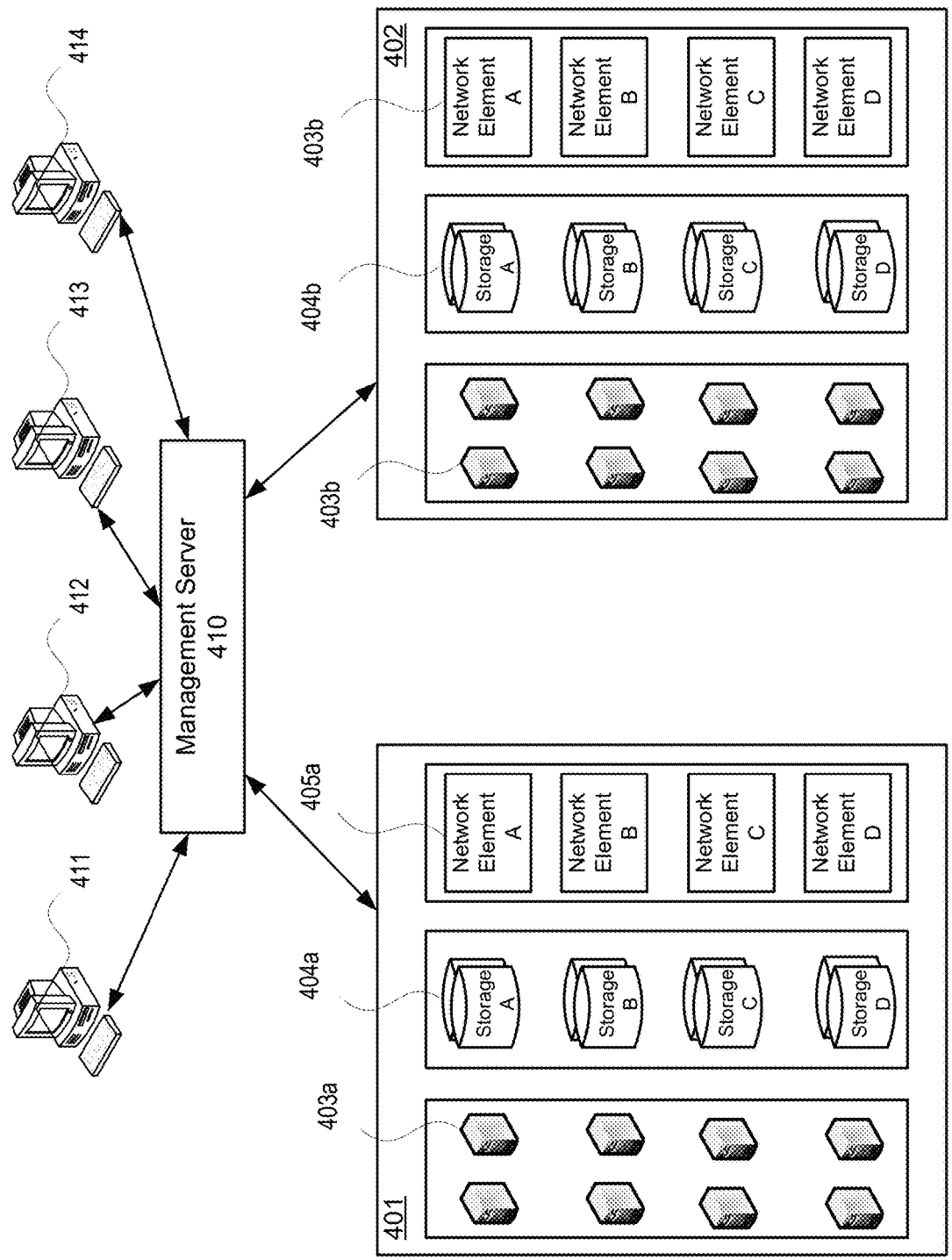
FIG. 4 depicts an illustrative cloud-based system architecture that may be used in accordance with an illustrative embodiment.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Enterprise Mobility Management Architecture

Figure 5:
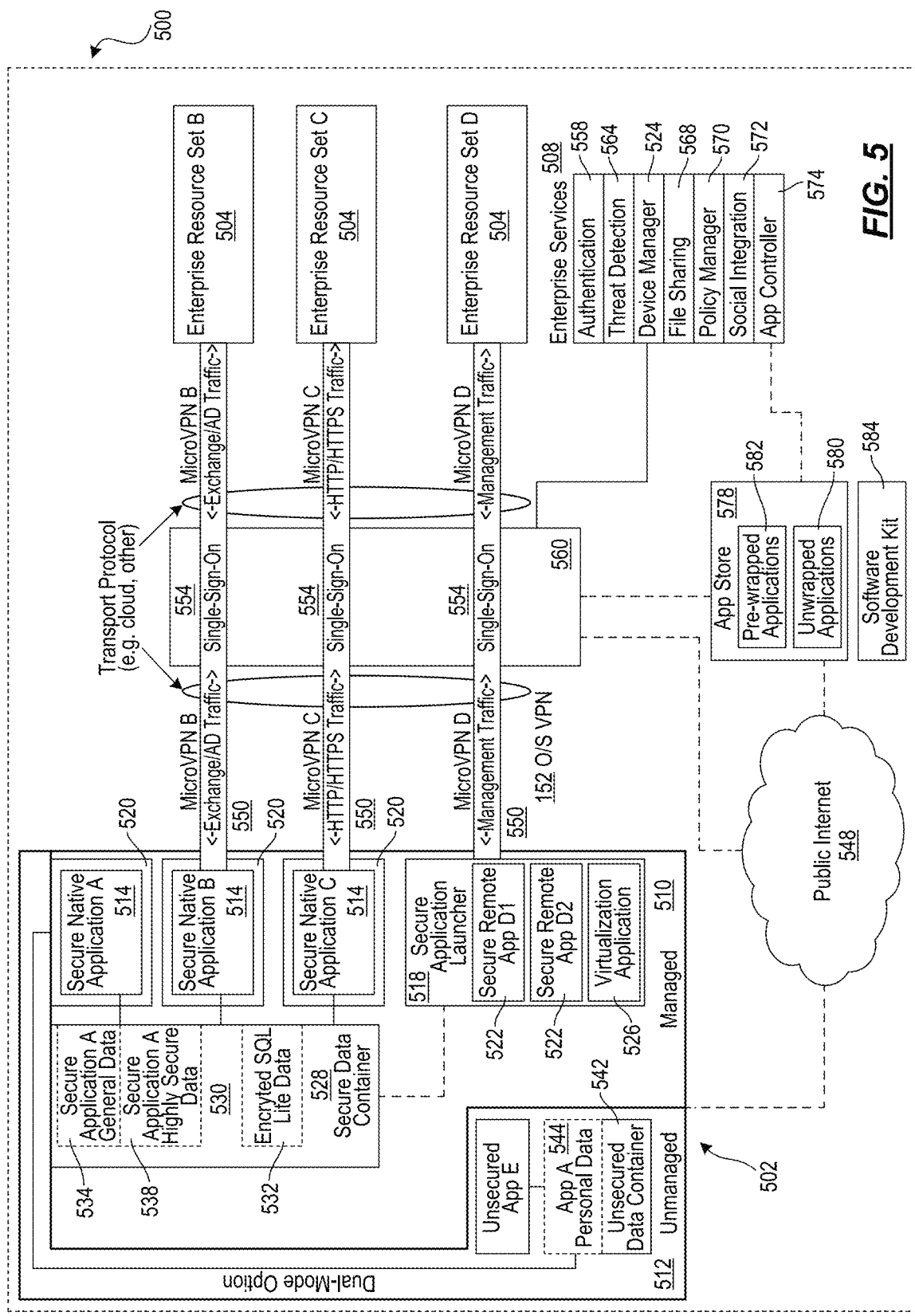
FIG. 5 depicts an illustrative enterprise mobility management system that may be used in accordance with an illustrative embodiment.

FIG. 5 represents an enterprise mobility technical architecture 500 for use in a BYOD environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to user. The user may utilize the mobile device 502 for business use only or for business and personal use. The mobile device may run an iOS operating system, and Android operating system, or the like. The enterprise may choose to implement policies to manage the mobile device 504. The policies may be implanted through a firewall or gateway in such a way that the mobile device may be identified, secured or security verified, and provided selective or full access to the enterprise resources. The policies may be mobile device management policies, mobile application management policies, mobile data management policies, or some combination of mobile device, application, and data management policies. A mobile device 504 that is managed through the application of mobile device management policies may be referred to as a managed device.

In some embodiments, the operating system of the mobile device may be separated into a managed partition 510 and an unmanaged partition 512. The managed partition 510 may have policies applied to it to secure the applications running on and data stored in the managed partition. The applications running on the managed partition may be secure applications. In other embodiments, all applications may execute in accordance with a set of one or more policy files received separate from the application, and which define one or more security parameters, features, resource restrictions, and/or other access controls that are enforced by the mobile device management system when that application is executing on the device. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple apps as described herein (virtual partition). Stated differently, by enforcing policies on managed apps, those apps may be restricted to only be able to communicate with other managed apps and trusted enterprise resources, thereby creating a virtual partition that is impenetrable by unmanaged apps and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application is executed on the device. The secure application wrapper 520 may include meta-data that points the secure native application 514 running on the mobile device 502 to the resources hosted at the enterprise that the secure native application 514 may require to complete the task requested upon execution of the secure native application 514. The secure remote applications 522 executed by a secure application launcher 518 may be executed within the secure application launcher application 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application may record user interactions associated with a GUI and communicate them to a server application where the server application will use the user interaction data as an input to the application operating on the server. In this arrangement, an enterprise may elect to maintain the application on the server side as well as data, files, etc. associated with the application. While an enterprise may elect to "mobilize" some applications in accordance with the principles herein by securing them for deployment on the mobile device, this arrangement may also be elected for certain applications. For example, while some applications may be secured for use on the mobile device, others might not be prepared or appropriate for deployment on the mobile device so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device so the enterprise may elect to provide access to the application through virtualization techniques. As yet another example, the enterprise may have an application that maintains highly secured data (e.g. human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device as well as a virtualization application to allow access to applications that are deemed more properly operated on the server side. In an embodiment, the virtualization application may store some data, files, etc. on the mobile phone in one of the secure storage locations. An enterprise, for example, may elect to allow certain information to be stored on the phone while not permitting other information.

In connection with the virtualization application, as described herein, the mobile device may have a virtualization application that is designed to present GUI's and then record/pass-through user interactions with the GUI. The application may communicate the user interactions to the server side to be used by the server side application as user interactions with the application. In response, the application on the server side may transmit back to the mobile device a new GUI. For example, the new GUI may be a static page, a dynamic page, an animation, or the like, thereby providing access to remotely located resources.

The secure applications may access data stored in a secure data container 528 in the managed partition 510 of the mobile device. The data secured in the secure data container may be accessed by the secure wrapped applications 514, applications executed by a secure application launcher 522, virtualization applications 526 executed by a secure application launcher 522, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Data stored in the secure data container 528 may be deleted from the device upon receipt of a command from the device manager 524. The secure applications may have a dual-mode option 540. The dual mode option 540 may present the user with an option to operate the secured application in an unsecured mode. In an unsecured mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 548 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device may connect to enterprise resources 504 and enterprise services 508 at an enterprise, to the public Internet 548, and the like. The mobile device may connect to enterprise resources 504 and enterprise services 508 through virtual private network connections. The virtual private network connections, also referred to as microVPN or application-specific VPN, may be specific to particular applications 550, particular devices, particular secured areas on the mobile device, and the like 552. For example, each of the wrapped applications in the secured area of the phone may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HTTP traffic, HTTPS traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway may also re-route traffic from the mobile device 502 to the public Internet 548, enabling the mobile device 502 to access publicly available and unsecured applications that run on the public Internet 548. The mobile device may connect to the access gateway via a transport network 562. The transport network 562 may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud based resources, and the like. The enterprise resources 504 may be accessed by the mobile device 502 directly or through the access gateway 560. The enterprise resources 504 may be accessed by the mobile device 502 via a transport network 562. The transport network 562 may be a wired network, wireless network, cloud network, local area network, metropolitan area network, wide area network, public network, private network, and the like.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services and the like. Authentication services 558 may use certificates. The certificates may be stored on the mobile device 502, by the enterprise resources 504, and the like. The certificates stored on the mobile device 502 may be stored in an encrypted location on the mobile device, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store may be provided with an intuitive and easy to use User Interface. The application store 578 may provide access to a software development kit 584. The software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
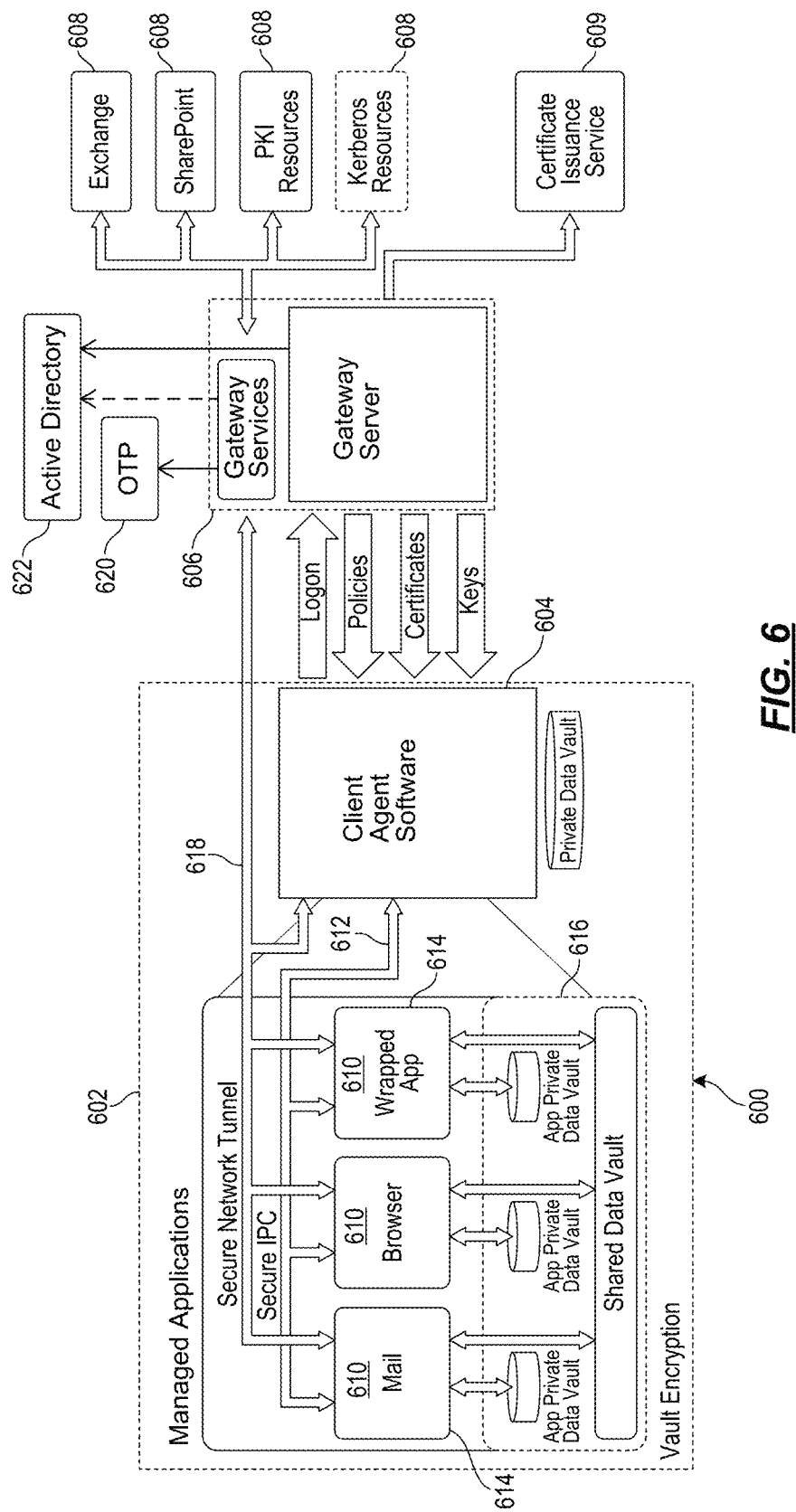
FIG. 6 depicts another illustrative enterprise mobility management system that may be used in accordance with an illustrative embodiment.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents a managed mobile device 602 with a client agent 604, which interacts with gateway server 606 (which includes Access Gateway and App Controller functionality) to access various enterprise resources 608 and services 609 such as Exchange, Sharepoint, PKI Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the HDX/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the device. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) with SSO to other gateway server components. The client agent 604 obtains policies from gateway server 606 to control the behavior of the managed applications 610 on the mobile device 602.

The Secure IPC links 612 between the native applications 610 and client agent 604 represent a management channel, which allows client agent to supply policies to be enforced by the application management framework 614 "wrapping" each application. The IPC channel 612 also allows client agent 604 to supply credential and authentication information that enables connectivity and SSO to enterprise resources 608. Finally the IPC channel 612 allows the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 requests policy information from client agent 604, which in turn requests it from gateway server 606. The application management framework 614 requests authentication, and client agent 604 logs into the gateway services part of gateway server 606 (also known as NetScaler Access Gateway). Client agent 604 may also call supporting services on gateway server 606, which may produce input material to derive encryption keys for the local data vaults 616, or provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel and obtain the policy for that application. The application management framework 614 may enforce relevant portions of the policy that apply locally, such as the client agent login dependencies and some of the containment policies that restrict how local OS services may be used, or how they may interact with the application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 is responsible for orchestrating the network access on behalf of each application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application may use a special background network access mechanism that allows it to access Exchange over an extended period of time without requiring a full AG logon. The Browser application may use multiple private data vaults to segregate different kinds of data.

This architecture supports the incorporation of various other security features. For example, gateway server 606 (including its gateway services) in some cases will not need to validate AD passwords. It can be left to the discretion of an enterprise whether an AD password is used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password. When data is stored locally on the device 602 in the secure container 616, it is preferred that a minimum of AES 256 encryption algorithm be utilized.

Other secure container features may also be implemented. For example, a logging feature may be included, wherein all security events happening inside an application 610 are logged and reported to the backend. Data wiping may be supported, such as if the application 610 detects tampering, associated encryption keys may be written over with random data, leaving no hint on the file system that user data was destroyed. Screenshot protection is another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the device is generated using a passphrase supplied by the user (if offline access is required). It may be XORed with another key randomly generated and stored on the server side if offline access is not required. Key Derivation functions may operate such that keys generated from the user password use KDFs (key derivation functions, notably PBKDF2) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key if the specific initialization vector used to encrypt the data is not known. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, when an application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature relates to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text is sent to the user with an OTP 620. In some cases, this may be implemented only for online use, with a prompt being a single field.

An offline password may be implemented for offline authentication for those applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature relates to the enablement of a client side certificate for certain applications 610 as secondary credentials (for the purpose of accessing PKI protected web resources via the application management framework micro VPN feature). For example, an application such as @WorkMail may utilize such a certificate. In this case, certificate-based authentication using ActiveSync protocol may be supported, wherein a certificate from the client agent 604 may be retrieved by gateway server 606 and used in a keychain. Each managed application may have one associated client certificate, identified by a label that is defined in gateway server 606.

Gateway server 606 may interact with an Enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications, and ultimately by arbitrary wrapped applications (provided those applications use web service style communication patterns where it is reasonable for the application management framework to mediate https requests).

Application management client certificate support on iOS may rely on importing a PKCS 12 BLOB (Binary Large Object) into the iOS keychain in each managed application for each period of use. Application management framework client certificate support may use a HTTPS implementation with private in-memory key storage. The client certificate will never be present in the iOS keychain and will not be persisted except potentially in "online-only" data value that is strongly protected.

Mutual SSL may also be implemented to provide additional security by requiring that a mobile device 602 is authenticated to the enterprise, and vice versa. Virtual smart cards for authentication to gateway server 606 may also be implemented.

Both limited and full Kerberos support may be additional features. The full support feature relates to an ability to do full Kerberos login to AD 622, using an AD password or trusted client certificate, and obtain Kerberos service tickets to respond to HTTP Negotiate authentication challenges. The limited support feature relates to constrained delegation in AFEE, where AFEE supports invoking Kerberos protocol transition so it can obtain and use Kerberos service tickets (subject to constrained delegation) in response to HTTP Negotiate authentication challenges. This mechanism works in reverse web proxy (aka CVPN) mode, and when http (but not https) connections are proxied in VPN and MicroVPN mode.

Another feature relates to application container locking and wiping, which may automatically occur upon jail-break or rooting detections, and occur as a pushed command from administration console, and may include a remote wipe functionality even when an application 610 is not running.

A multi-site architecture or configuration of StoreFront and App Controller may be supported that allows users to be service from one of several different locations in case of failure.

In some cases, managed applications 610 may be allowed to access a certificate and private key via an API (example OpenSSL). Trusted managed applications 610 of an enterprise may be allowed to perform specific Public Key operations with an application's client certificate and private key. Various use cases may be identified and treated accordingly, such as when an application behaves like a browser and no certificate access is required, when an application reads a certificate for "who am I," when an application uses the certificate to build a secure session token, and when an application uses private keys for digital signing of important data (e.g. transaction log) or for temporary data encryption.

Illustrative Embodiment(S)

Figure 7:
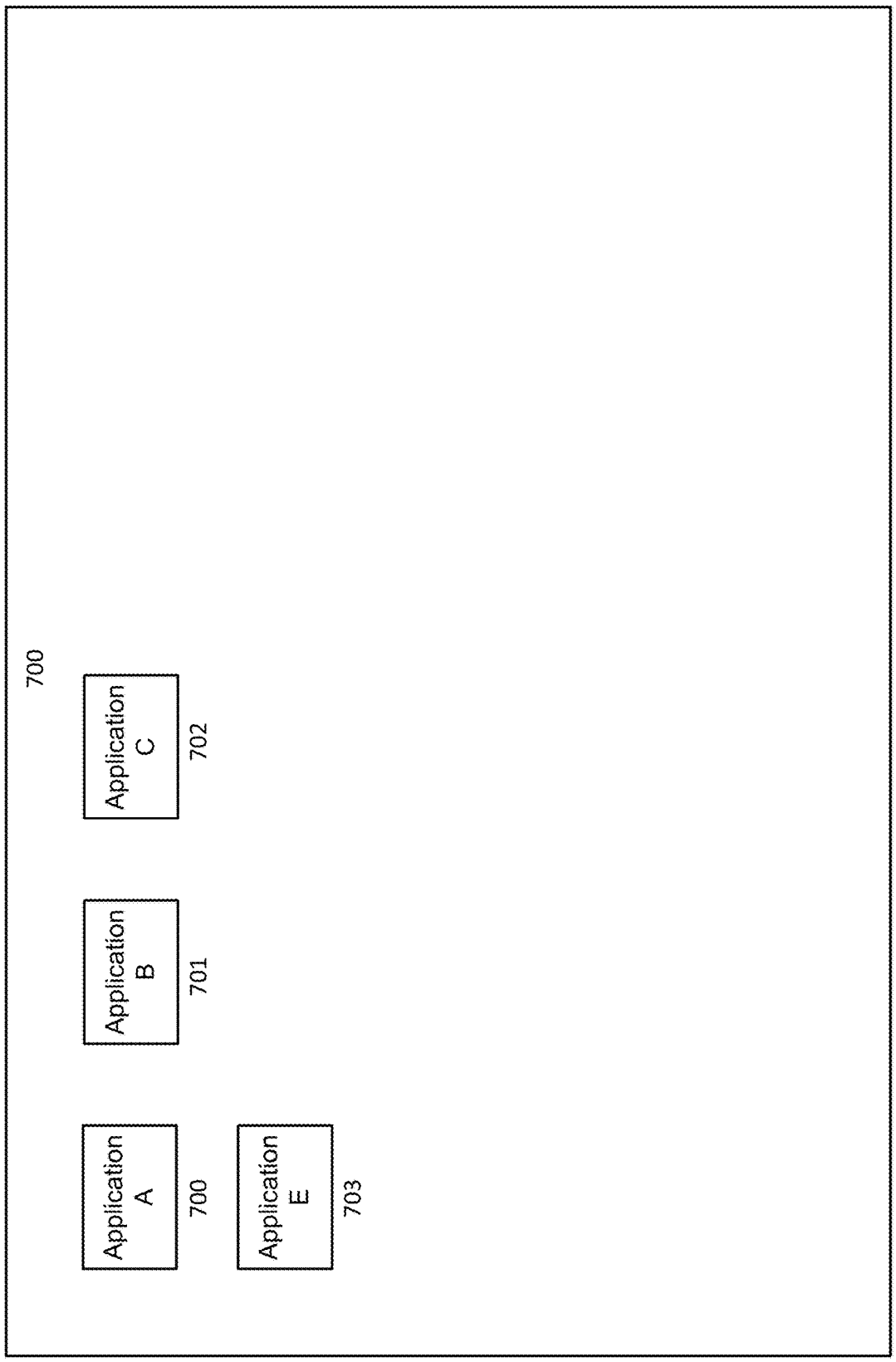
FIG. 7 depicts a sample interface of a mobile device in accordance with an illustrative embodiment.

FIG. 7 illustrates a sample interface of a mobile device, and FIGS. 8-14 illustrate sample embodiments of methods for determining an operation mode for an application. The methods depicted in FIGS. 8-14 may be combined in any suitable manner in various embodiments. The sample interface depictured in FIG. 7 may be displayed on a mobile device, such as device 107, 109, 240, 502, and/or 602, and the methods depicted in FIGS. 8-14 may be implemented by such a mobile device.

Figure 8:
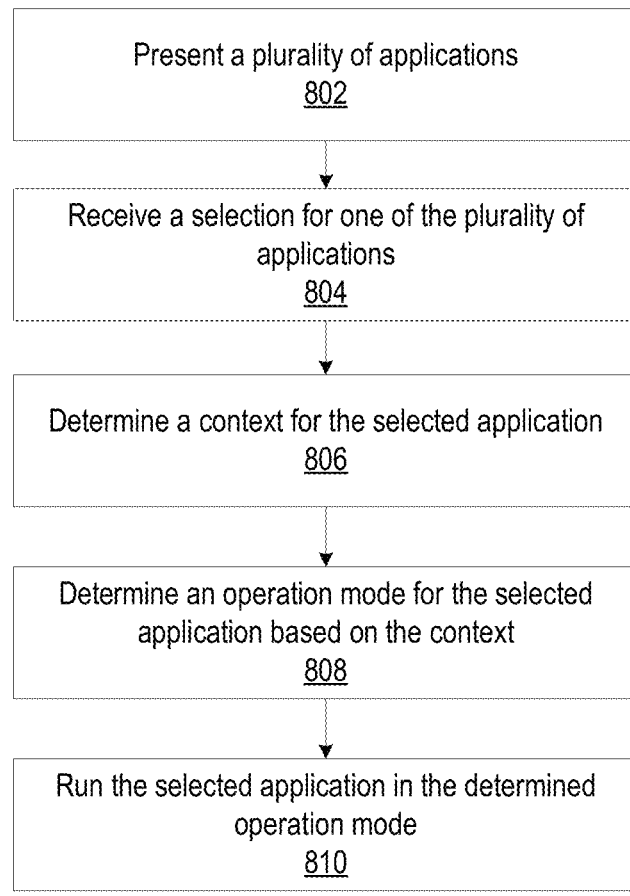
FIG. 8 is a flowchart for determining an application mode for an application in accordance with an illustrative embodiment.

In FIG. 8, a flowchart of example method steps for determining an application mode for an application is shown. The method of FIG. 8 may begin at step 802, where a plurality of applications are presented. For example, a plurality of applications may be presented to a user on a mobile device. FIG. 7 illustrates an embodiment where user interface 700 displayed on a mobile device (e.g., tablet, smart phone, or the like) presents Applications A 700, B 701, C 702, and E 703 to a user. This is merely an example, and the plurality of applications may be presented in any suitable manner. In an embodiment, the plurality of applications may comprise email applications, web browsing applications, software-as-a-service (SaaS) access applications, and the like.

The method of FIG. 8 may proceed from step 802 to step 804, where a selection for one of the plurality of applications is received. With reference to an embodiment depicted in FIG. 7, a user of a mobile device may select one of the presented applications by, for example, pressing a display of the mobile device to select the application. This is merely an example, and the application may be selected in any suitable manner.

The method of FIG. 8 may proceed from step 804 to step 806, where a context for the selected applications is determined based on one or more operational parameters of the device executing the selected application. For example, a context may be based on an account to be accessed by the application, a location of the mobile device or a network connectivity status of the mobile device executing the application, or based on any other operational parameter. The methods of FIGS. 9-13, further described below, illustrate various embodiments where example contexts are described.

The method of FIG. 8 may proceed from step 804 to step 806, where an operation mode for the selected application is determined based on the context. In an embodiment, the operations modes may comprise managed and unmanaged modes, e.g., representing work and non-work modes of a device for when a user is performing employment-related versus personal activities, respectively. The work mode may provide access to enterprise resources and include one or more content filters and/or restrictions, whereas the non-work mode might apply policies (or no policies) and/or content filters/restrictions (or none) that allow access to only non-enterprise related resources.

In addition, there may be multiple different managed modes, e.g., based on different security levels of various users or sets of credentials provided by a user, different user roles identified by a set of credentials (e.g., manager versus staff employees), geographic locations from which the device is operated, network locations, operational environment (e.g., a healthcare-related managed mode versus a financial industry managed mode), or based on any other contextual determination. Some modes may be based on multiple contexts, e.g., location and role. In one such combination a first managed mode may provide applicable policies for a healthcare provider, whereas a second managed mode may apply applicable policies for a patient. As a device is passed between the two users, the user (or software based on user action) may initiate a change of mode as the device is passed to a user having a different role. The new user may be required to enter appropriate credentials to change modes, e.g., when changing to a more secure mode. The healthcare provider mode may provide access to a wide array of patient records, resources, scheduling details, financial records, and other information, whereas a patient mode may be limited to only that patient's information, e.g., based on HIPPA and other privacy considerations. Other combinations of contextual decisions may also be used.

In an embodiment, the determined context may be compared to a stored policy in order to determine an operation mode. A mobile device, such as mobile device 502, may store one or more policies used to determine an operation mode for an application. In an embodiment, the policies may be stored remotely, such as at policy manager 570, described above with reference to FIG. 5, or may be stored locally on the device. In an example, a context may comprise a selected application configured to access a secure account, such as an email application configured to access a secure email account. This context may be compared to a stored policy. For instance, the stored policy may define that an email application that is configured to access a secure email account is to be run as a managed application. The stored policy may further indicate that the email application, when configured to access a personal account of the device user, may operate in an unmanaged mode. Additional contexts and policies will be described with respect to FIGS. 9-13.

The method of FIG. 8 may proceed from step 806 to step 808, where the selected application is run in the determined operation mode. For example, the operation mode may be determined as unmanaged, or as one of multiple managed modes, and the selected application may be run in the determined mode.

In an embodiment, a managed operation mode may include running the application as a part of the managed partition 510 of mobile device 502, as described above with reference to FIG. 5. As such, the managed application may be run as secure native applications 514, secure remote applications 522 executed by a secure application launcher 518, virtualization applications 526 executed by a secure application launcher 518, and the like.

In an embodiment, an application running in managed mode may access data stored in a secure data container 528 in the managed partition 510 (physical, logical, or virtual) of the mobile device. The data stored in the secure data container 528 may include data restricted to a specific secure/managed application 530, shared among other secure/managed applications, and the like. Data restricted to a secure application may include secure general data 534 and highly secure data 538. Different levels and types of security features may be used to differentiate levels of secure data. In an embodiment, an application running in managed mode may save, modify, or delete data in secure data container 528. The data saved or modified may be encrypted similar to other data stored in secure data container 528.

In an embodiment, an application running in managed mode may connect to enterprise resources 504 and enterprise services 508 through virtual private network connections, as described about with reference to FIG. 5. The virtual private network connections may be microVPNs, which are specific to a particular application, such as the selected application, particular devices, particular secured areas on the mobile device, and the like. For example, wrapped applications in a secured area of the phone may access enterprise resources through an application specific VPN such that access to the VPN would be granted based on attributes associated with the application, possibly in conjunction with user or device attribute information, and policy information.

In an embodiment, an application running in managed mode may encrypt data transmitted from the application. For example, an application running in managed mode may be communicating with a computing device over a network, and the data transmitted from the application to the device may be encrypted. In addition, the data communicated from the computing device to the application may also be encrypted, and the application running in managed mode may be configured to decrypt the received data.

In an embodiment, an application running in managed mode my access a secure portal. For example, an application may connect to a computing device over a network, for example, a microVPN, and may access a secure portal that might not be access by unsecured applications, such as applications running in unmanaged mode.

In an embodiment, an unmanaged operation mode may include running the application as a part of the unmanaged partition 512 (physical, logical, or virtual) of mobile device 502, as described above with reference to FIG. 5. In an unmanaged mode, the application may access data stored in an unsecured data container 542 on the unmanaged partition 512 of the mobile device 502. The data stored in an unsecured data container may be personal data 544.

In an embodiment, where more than one managed mode is possible, an application running in a less secure managed mode may be run similar to an application running in the more secure managed mode, but might not include all aspects of the latter. For example, an application running in the less secure managed mode may have the information transmitted from the application over a network encrypted, but the application might not have access to secure data container 528, as described with reference to FIG. 5. In another example, an application running in the less secure managed mode may have access to secure data container 528, but might not be able to connect to enterprise resources 504 and enterprise services 508 through virtual private network connections. Accordingly, depending on the determined context, an application running in a less secure managed mode may include aspects of an application running in the more secure managed mode and aspects of an application running in unmanaged mode.

In FIGS. 9-13, flowcharts of example method steps for determining a context and operation mode for an application are shown. In an embodiment, steps 806 and 808 of FIG. 8 may comprise the method steps of any one or more of FIGS. 9-13. The method of FIG. 9 may begin at step 902, where an account to be accessed by a selected application is detected. For example, a selected application may comprise an email application and an email account that the email application is configured to access may be detected. In this example, the email application may be able to access multiple email accounts, such as an enterprise email account and a personal email account, and the account that the email application is configured to access at the time of running may be determined as the context account to be accessed.

Figure 9:
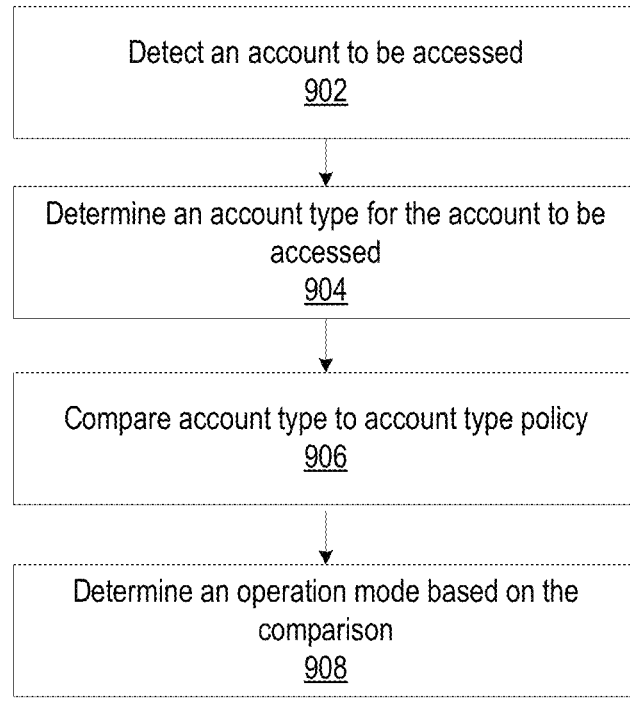
FIG. 9 is a flowchart for determining an account type context for an application in accordance with an illustrative embodiment.

The method of FIG. 9 may proceed from step 902 to step 904, where an account type of the account to be accessed may be determined. The account type may comprise a context for the selected application. For example, a selected application may comprise an email application and the email application may be configured to access an enterprise account. In another example, the email application may be configured to access a personal account.

The method of FIG. 9 may proceed from step 904 to step 906, where an account type may be compared with an account type policy. For example, a policy may define that an email application that is to access an enterprise account should run in managed mode and an email application that is to access a personal account should run in unmanaged mode. The method of FIG. 9 may proceed from step 906 to step 908, where an operation mode is determined based on the comparison.

Figure 10:
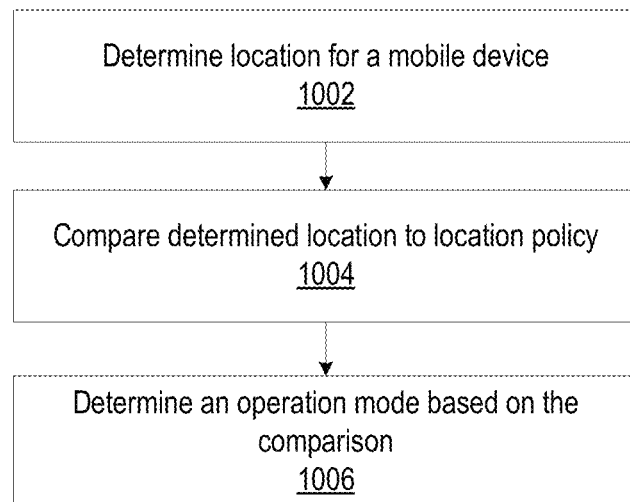
FIG. 10 is a flowchart for determining a location context for an application in accordance with an illustrative embodiment.

The method of FIG. 10 may begin at step 1002, where a location for a mobile device is determined. For example, a mobile device, such as mobile device 502, may implement the method of FIG. 10, and a location for the mobile device may be determined. The location may be determined by GPS, signal triangulation, or any other suitable or otherwise known manner. The location may comprise a context for the selected application.

The method of FIG. 10 may proceed from step 1002 to step 1004, where a determined location may be compared with a location policy. For example, a policy may define that a selected application run in a more secure managed mode when in a certain location, for example, on company premises. In an embodiment, a policy may define that a selected application run in a less secure managed mode when in a certain location, for example, when the determined location is inside the United States but off company premises. For example, the less secure managed mode may encrypt communication to and from the selected application, but might not allow access to enterprise resources, such as resources 504. In another embodiment, a policy may define that a selected application run in unmanaged mode when in a certain location, for example, when the determined location is outside the United States. The method of FIG. 10 may proceed from step 1004 to step 1006, where an operation mode is determined based on the comparison.

Alternatively or in addition to physical location, a network location may also or instead be used to determine whether access is permitted. For example, network location may refer to whether a user is either internal to a data center (or pre-approved Wifi access point), or is external to it. Appropriate access modes may be based on such a determination.

Figure 11:
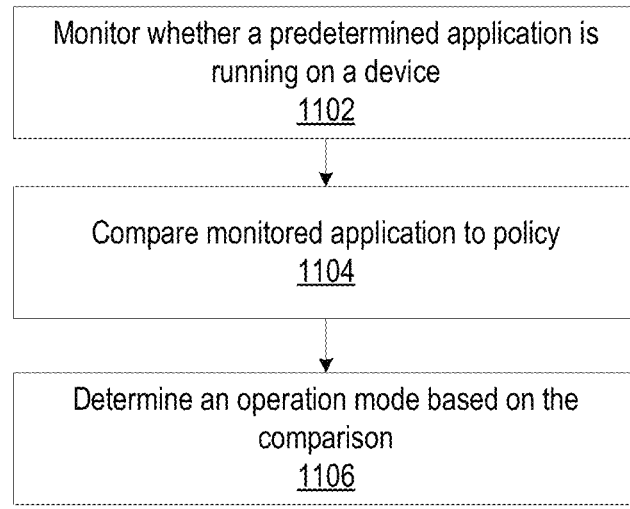
FIG. 11 is a flowchart for determining a predetermine application status context for an application in accordance with an illustrative embodiment.

The method of FIG. 11 may begin at step 1102, where it is monitored whether a predetermined application is running on a device. For example, a mobile device, such as mobile device 502, may implement the method of FIG. 11, and the mobile device may be monitored to determine whether a predetermined application is running. The predetermined application may comprise any application capable of running on the mobile device, such as a client agent 604 as described with reference to FIG. 6. The monitored predetermined application may comprise a context for the selected application.

The method of FIG. 11 may proceed from step 1102 to step 1104, where a monitored application is compared against a policy. For example, a policy may define that a selected application run in managed mode when a predetermined application, such as client agent 604, is running and that the selected application run in unmanaged mode when the predetermined application is not running. The method of FIG. 11 may proceed from step 1104 to step 1106, where an operation mode is determined based on the comparison.

Figure 12:
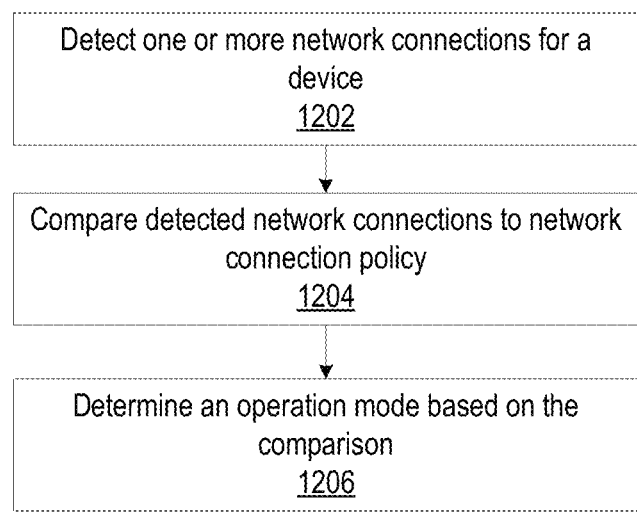
FIG. 12 is a flowchart for determining a network connection context for an application in accordance with an illustrative embodiment.

The method of FIG. 12 may begin at step 1202, one or more network connections are detected. For example, a mobile device, such as mobile device 502, may implement the method of FIG. 12, and the network connections that the mobile device makes may be detected. In an example, network connections may comprise a connection to a cellular network, a connection to a WIFI network, or a connection to a Wireless Local Area Network (WLAN), or the like. The one or more network connections may comprise a context for the selected application.

The method of FIG. 12 may proceed from step 1202 to step 1204, where detected network connections are compared against a network connection policy. For example, a policy may define that a selected application run in managed mode when a mobile device is connected to an internal network, such as a WLAN internal to a company, and that the selected application run in unmanaged mode when the mobile device is only connected to a wireless network, such as cellular network or WIFI network. The method of FIG. 12 may proceed from step 1204 to step 1206, where an operation mode is determined based on the comparison.

Figure 13:
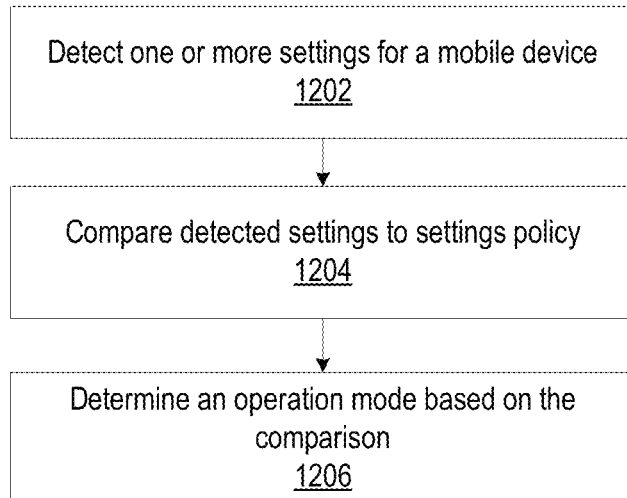
FIG. 13 is a flowchart for determining a settings context for an application in accordance with an illustrative embodiment.

The method of FIG. 13 may begin at step 1302, where one or more settings for a mobile device are detected. For example, a mobile device, such as mobile device 502, may implement the method of FIG. 13, and one or more settings for the mobile device may be detected. In an example, it may be detected whether the mobile device has a lock screen, such as a PIN required for using the mobile device, or it may be detected whether the mobile device is jailbroken/rooted, e.g., has received after-market modifications. The one or more settings may comprise a context for the selected application.

The method of FIG. 13 may proceed from step 1302 to step 1304, where detected settings are compared against a settings policy. For example, a policy may define that a selected application might not run in managed mode if the mobile device does not have a lock screen or if the mobile device is jailbroken/rooted. The method of FIG. 13 may proceed from step 1304 to step 1306, where an operation mode is determined based on the comparison. In an embodiment, when running the selected application in the determined mode, an indicator may be displayed on the mobile device that informs a user of certain policies, such as a requirement for a mobile device to have a lock screen before the mobile device is allowed to run the selected application in managed mode. FIGS. 9-13 describe a plurality of contexts, and any other suitable context and corresponding policy may be implemented.

In an embodiment, one or more of the contexts described in FIGS. 9-13 may be combined and these contexts may be compared against a policy for the selected application. For example, contexts for a selected application may comprise an account type to be accessed as an enterprise email account and a detected network connection as a cellular network. In this example, the policy may define that when an enterprise account is attempted to be accessed over a cellular network, the selected application should be run in managed mode. The policy may be defined in this way because the selected application may encrypt the communication with the enterprise email account, and therefore the risk of sending secure traffic over a cellular network may be mitigated.

In another example, contexts for a selected application may comprise a determined location outside of the United States and a network connection with a WLAN internal to a company. A policy may define that a selected application is to run in managed mode when a determined location is outside the United States and a network connection is with a WLAN internal to a company. The policy may be defined in this way because a network connection with a WLAN internal to a company mitigates the risk associated with secure communications outside of the United States.

In an embodiment, the one or more contexts as described in FIGS. 9-13 may include a priority. For example, a context for a selected application may comprise a determination that the mobile device is jailbroken/rooted, and a policy may define that a selected application is to run only in unmanaged mode when a context indicates a jailbroken/rooted mobile device, regardless of what other contexts indicate. Accordingly, a jailbroken/rooted mobile device will have a selected application run in unmanaged mode even when the mobile device is connected to a WLAN internal to a company or if the selected application is attempting to access an enterprise account.

In an embodiment, a policy may indicate that a selected application is to be run in a less secure managed mode based on a plurality of contexts as described in FIGS. 9-13. For example, contexts for a selected application may comprise an account type to be accessed as an enterprise email account and a detected network connection as a cellular network. In this example, the policy may define that when an enterprise account is attempted to be accessed over a cellular network, the selected application should be run in the less secure managed mode. The less secure managed mode may encrypt communication to and from the selected application, but might not allow access to enterprise resources, such as resources 504. The policy may be defined in this way because the encrypted communication with the enterprise email account may be a low risk communication, and allowing access to enterprise resources may be a high risk communication.

Figure 14:
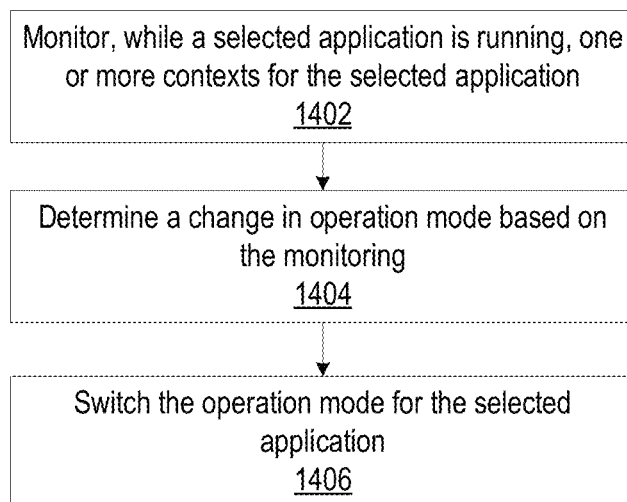
FIG. 14 is a flowchart for switching an application mode for an application in accordance with an illustrative embodiment.

In FIG. 14, a flowchart of example method steps for switching an operation mode for an application is shown. For example, the method steps of FIG. 14 may follow the method steps of FIG. 8. The method of FIG. 14 may begin at step 1402, where one or more contexts may be monitored while a selected application is running. In an embodiment, one or more of the contexts described with reference to FIGS. 9-13 may be monitored. For example, a mobile device running a selected application may be connected to a cellular network and while the selected application is running, the mobile device may make a new network connection with a WLAN internal to a company.

The method of FIG. 14 may proceed from step 1402 to step 1404, where a change in an operation mode for a selected application is detected based on the monitoring. Stated differently, the mobile device may detect a change in information that formed the basis for selecting a particular operational mode. For example, a selected application may be running in unmanaged mode, and once a mobile application running the selected application connects to a WLAN internal to a company, a policy may define that the operation mode for the selected application should switch to managed mode. The method of FIG. 14 may proceed from step 1404 to step 1406, where the operation mode for the selected application is switched.

In an embodiment, a manager, such as a mobile device manager, may manage one or more mobile devices. In this example, the mobile device may be referred to as an enrolled device. In an embodiment, a mobile device may be managed based on software installed on the a managed, such as a client agent 604 of FIG. 6.

In an example, client agent 604 may further include a connection management software development kit (SDK), a connection manager 520, a connection/status application programming interface (API), a set of virtualization services, a runtime SDK, a platform SDK, and a client core.

The virtualization service in the client agent architecture may include, for example, a graphics service, a desktop integration service, a multimedia service, input/output services, a smart card service, a printing service, and the like. The runtime SDK may be, for example, Independent Computing Architecture (ICA) runtime SDK, including an ICA engine. The platform SDK may be, for example, an ICA platform SDK or other platform SDK, and may include various subcomponents such as a virtual channel SDK, a configuration and load manager, a trace subcomponent, a platform abstraction SDK, and the like. The client core may include, for example, a core protocol for remote access to terminal services (e.g., a Winstation driver with a core ICA protocol), a reducer subcomponent configured to perform compression and prioritization, a multi-stream ICA, a TCP stack with session reliability, proxy, and SSL, and a UDP subcomponent. The client core also may include implementations of platform-specific subcomponents, such as graphics smart card and thread support, configuration and load manager libraries, an SSL SDK, and the like.

A mobile device may be enrolled in an enterprise system using, for example, client agent 604. For example, in an enrolled client device 602, a client agent 604 may interact with a gateway server 606 or other access gateway to access various enterprise resources 608 and services 609. Enrolling a device may involve bring your own device (BYOD) and related technologies, and opting in to an MDM or similar system. Enrollment of a device with a company account (or other organization account) may involve pushing certificates to the device and registering the device with a device management server of an enterprise system. After enrollment, the device may be "governed" by a company administrator (or other organization administrator) using mobile device management (MDM) and/or mobile device experience technology (Application management framework) policies that are pushed to the device. Enrolled devices may also be referred to as managed devices. Stated differently, after enrollment, a device may become a managed device as described herein. In certain examples, to enroll a device in an enterprise system, a client agent 604 and/or an application enrollment token may be downloaded and installed on the device. The application enrollment token may be derived from a certificate of a company or other organization to which the device will be enrolled. After downloading the client agent 604 and application enrollment token, the device user may be prompted to open the token and add the company account (or other organization account) to the device.

In an embodiment, an enrolled mobile device, such as mobile device 502 of FIG. 5, may be managed by a service, such as device manager 524 of FIG. 5. Device manager 524 may provide services that include configuration, provisioning, security, support, monitoring, reporting, and decommissioning. For example, device manager 524 may monitor what applications are installed on an enrolled/managed mobile device. In this example, device manager 524 may store/access a list of black-listed applications and may further determine the installation of a black-listed application on an enrolled/managed mobile device. A black-listed application may comprise an application that is suspected malware or any other suitable application. In another example, device manager 524 may monitor an operating state for an enrolled mobile device. In this example, device manager 524 may determine that an enrolled mobile device has been jailbroken/rooted. Device manager 524 may perform various management activities on an enrolled device based on these determinations.

In another example, device manager 524 may monitor a network connection for the mobile device. In this example, device manager 524 may determine that an enrolled mobile device is connected to a cellular network, a wireless local area network (WLAN), a local area network (LAN), a combination of these, or any other suitable network. In another example, device manager 524 may monitor a location for the mobile device. In this example, device manager 524 may determine the geographic location for the mobile device, such as the latitude and longitude, the country, the state, any suitable region, or any other suitable location for the mobile device.

In another example, device manager 524 may monitor whether a particular application is running on the mobile device. In this example, device manager 524 may determine whether the particular application, such as client agent 604 of FIG. 6, is running on the mobile device. Device manager 524 may perform various management activities on an enrolled device based on these determinations.

In an embodiment, an application installed on an enrolled mobile device may run in managed mode or unmanaged mode, as described above. In an embodiment, a managed operation mode may include running the application as a part of the managed partition 510 of mobile device 502, as described above with reference to FIG. 5. In an embodiment, an application running in managed mode may access data stored in a secure data container 528 in the managed partition 510 of the mobile device. The data stored in the secure data container 528 may include data restricted to a specific secure application 530, shared among other secure applications, and the like. Data restricted to a secure application may include secure general data 534 and highly secure data 538. Secure general data may use a strong form of encryption such as AES 128-bit encryption or the like, while highly secure data 538 may use a very strong form of encryption such as AES 254-bit encryption. Other types of encryption may be used, and other levels and types of security measures may be applied based on a desired level and/or type of security, as well as different key recovery features. In an embodiment, an application running in managed mode may save, modify, or delete data in secure data container 528. The data saved or modified may be encrypted similar to other data stored in secure data container 528.

In an embodiment, a managed mode may comprise an enterprise mode and an unmanaged mode may comprise a personal mode. For example, when the application is running in managed mode, or enterprise mode, the application may have access to resources stored on a secure server (e.g., enterprise data). A device manager 524 managing the device may be associated with an enterprise. In this example, the application running in managed mode may be able to communicate with one or more servers (e.g., gateway server 606) that grant the application access to enterprise data. When the application is running in unmanaged mode, or personal mode, the application may not have access to the enterprise data.

Figure 15:
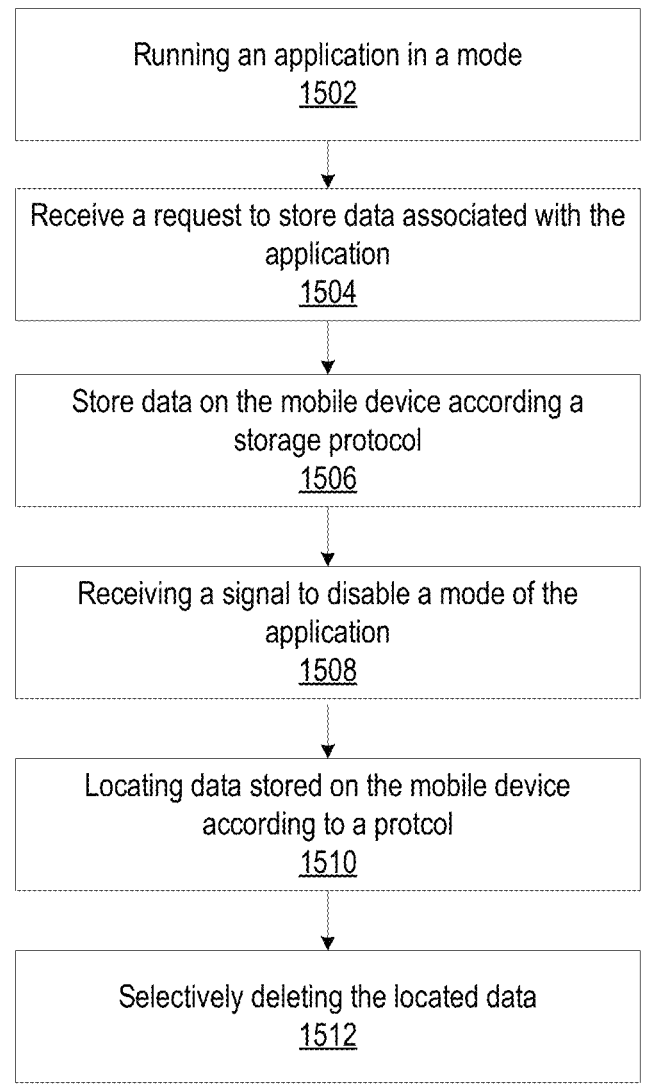
FIG. 15 is a flowchart for managing an application with multiple operation modes in accordance with an illustrative embodiment.

In an embodiment, an application that is capable of running in managed mode or unmanaged mode may leverage storage policies for storing data associated with the application. In FIG. 15, a flowchart of example method steps for managing an application that runs in multiple modes is shown. FIG. 15 may begin at step 1502, where an application runs on a mobile device in one of managed mode or unmanaged mode. For example, an application capable of running in managed mode or unmanaged mode, as described above, may run in one of these modes.

The process of FIG. 15 may proceed from step 1502 to step 1504, where a request is received to store data associated with the application. For example, when the application is running in managed mode, a request may be received to store data, such as secured data accessed from a secured server (e.g., gateway server 606). In such an example, the secured data may comprise enterprise data, as described above. In another example, when the application is running in unmanaged mode, a request may be received to store data, such as personal data.

The process of FIG. 15 may proceed from step 1504 to step 1506, where data is stored on the mobile device according to a storage protocol. A storage protocol may define the manner in which the requested data is to be stored on the mobile device. For example, when the application is running in managed mode, the data may be stored according to a first protocol, and when the application is running in unmanaged mode, the data may be stored according to a second protocol.

In an embodiment, the first storage protocol may define that the requested data may be stored in a first data container, such as a secured data container (e.g., secured data container 528). In this example, the data stored in the first data container may not be accessible to the application while the application is running in unmanaged mode. In an embodiment, the second storage protocol may define that the requested data may be stored in a second data container different from the first data container. The second data container may comprise a general data container that stores, for example, personal data.

In an embodiment, the first storage protocol may define that the requested data may be encrypted prior to storage. In this example, the data may be encrypted using a first key and, in some embodiments, the first key may be associated with a device manager that manages the device (e.g., device manager 524). In an embodiment, the second storage protocol may define that the requested data may be encrypted prior to storage using a second key different from the first key. In another example, the first storage protocol may define that the requested data may be stored unencrypted.

Stored data may be automatically updated when a storage protocol changes or is modified. For example, a policy may be updated that changes the encryption scheme used for data storage from a first type of encryption to a second type of encryption. When this occurs, the mobile device may automatically decrypt the stored data based on the first type of encryption and re-encrypt the stored data based on the second type of encryption using the new or revised policy. In this manner stored data may always be kept compliant with a current storage policy.

In an embodiment, the first storage protocol may define that the requested data may be stored in association with a managed account. The application running in managed mode may be associated with a managed account. For example, a cloud storage application that, while running in managed mode, allows access to secured data may be associated with a managed account used to gain access to the secured data. The requested data may be stored in association with this managed account. In an embodiment, the first storage protocol may define that the requested data stored may be managed by device manager 524.

Accordingly, while the application is running in managed mode, data may be stored according to the first protocol, as described above. While the application is running in unmanaged mode, data may be stored according to the second protocol, as described above.

In some embodiments, the type and/or location of storage may be dependent on the operation mode in use. For example a storage protocol or policy may specify that data is to be stored in cloud-based storage. The storage protocol or policy may further specify that either enterprise or non-enterprise cloud storage should be used, based on operation mode. When in managed mode, data may be saved to an enterprise or other cloud storage where a predefined level of security is provided, as selected by the enterprise or policy. Alternatively, when in unmanaged mode, data may be saved or stored in a less secure cloud storage service or location, e.g., as selected by the user. Illustrative embodiments may include hybrid storage policies wherein based on certain circumstances of the mobile device or application, data may be stored locally when an app is running unmanaged and data may be stored in cloud storage when the app is running in managed mode, or vice versa.

The process of FIG. 15 may proceed from step 1506 to step 1508, where a signal is received to disable a mode of the application. For example, a signal may be received to disable the managed mode of the application. In an embodiment, device manager 524 may monitor an enrolled mobile device, detect a state for the mobile device, and send a signal to disable a managed mode of an application installed on the mobile device. For example, device manager 524 may detect that an enrolled mobile device is jailbroken/rooted, and may determine to disable the managed mode of the application based on the detection. In another embodiment, device manager 524 may detect that a black listed application has been installed on an enrolled mobile device, and may determine to disable the managed mode of the application based on the detection.

In another embodiment, device manager 524 may detect that a managed account associated with the application has expired or has been deleted, and may determine to disable the managed mode of the application based on the detection. For example, a cloud storage application that, while running in managed mode, allows access to secured data may be associated with a managed account used to gain access to the secured data. Device manager 524 may detect that the managed account has expired or has been deleted and may send a signal to disable the managed mode of the cloud storage application based on the detection. In an embodiment, when a signal to disable a managed mode of the application is received, the application may be converted into an application that does not run in managed mode.

In an embodiment, based on the received signal to disable a managed mode of an application, it may be determined that data stored according to a first protocol is to be selectively deleted. For example, data stored according to a first protocol may be associated with the managed mode that is to be disabled, and the data stored according to the first protocol may be selectively deleted as a part of disabling the managed mode.

The process of FIG. 15 may proceed from step 1508 to step 1510, where data stored on the mobile device according to a protocol is located. For example, device manager 524 may monitor an enrolled mobile device and locate data that is stored according to a first protocol. The data stored according to the first protocol may comprise data associated with a particular application running in a first mode, such as an application running in a managed mode. In an embodiment, the located data may comprise enterprise data for the application.

In an embodiment, the data stored according to the first protocol may be located based on an account. For example, an account may be associated with a managed account. An application may run in managed mode and stored data may be associated with the managed account. In this embodiment, the data stored according to the first protocol may be associated with the managed account, and the data stored according to the first protocol may be located based on the managed account.

In another embodiment, the data stored according to the first protocol may be located based on a storage container. For example, a secure storage container, such as secure data container 528 of FIG. 5, may be associated with data stored according to the first protocol. An application may run in managed mode and data stored according to the first protocol may be stored in the secure data container. In this embodiment, the data stored according to the first protocol may be stored in the secure data container, and the data stored according to the first protocol may be located based on the storage in the secure storage container.

In another embodiment, the data stored according to the first protocol may be located based on an encryption. For example, data stored according to the first protocol may be encrypted using a particular encryption, such as an encryption using a first key. An application may run in managed mode and data stored according to the first protocol may be encrypted based on the particular encryption. In this embodiment, the data stored according to the first protocol may be located based the encryption for the data. In an example, the first key may be associated with device manager 524.

The process of FIG. 15 may proceed from step 1510 to step 1512, where the located data is selectively deleted. For example, device manager 524 may monitor an enrolled mobile device, locate data stored according to the first protocol on the enrolled mobile device, and selectively delete the located data. In an embodiment, selectively deleting the located data does not delete any other data stored on the mobile device. For example, where the located data comprises enterprise data for an application, the personal data for the application might not be deleted. Alternatively, access to data stored according to the first protocol may be locked or blocked until the device reenrolls or the application is capable of again running in managed mode.

Figure 16:
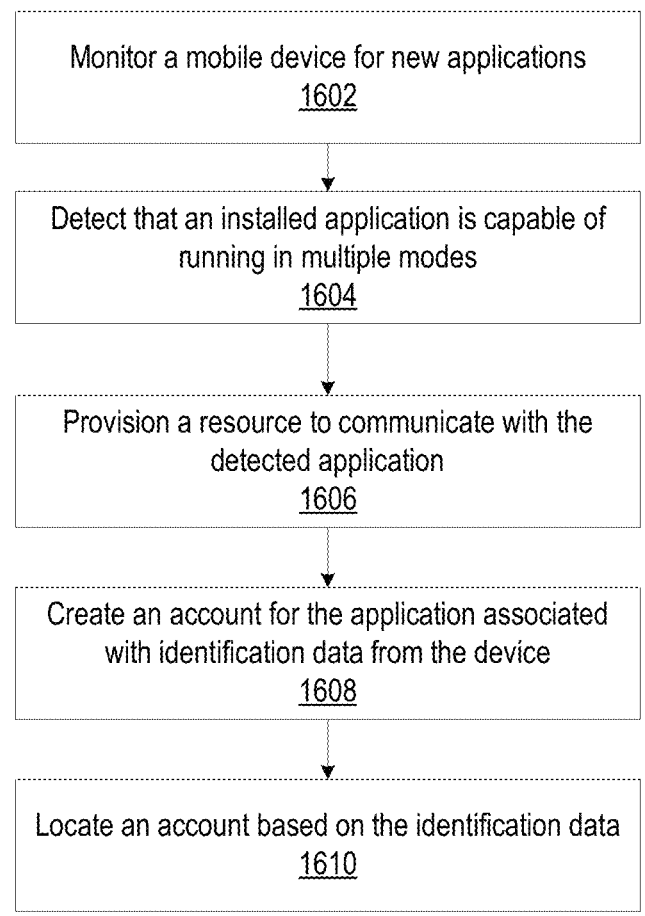
FIG. 16 is a flowchart for managing a multi-mode application in accordance with an illustrative embodiment.

In FIG. 16, a flowchart of example method steps for managing an account for an application capable of executing in multiple modes is shown. The process of FIG. 16 may be used upon detection that an installed application is capable of executing in multiple modes to configure access to enterprise resources by the application executing in a managed mode. In addition, resources may be pre-provisioned based on certain events (e.g., a new employee starts with a company, and resources are pre-provisioned as part of the new employee procedures), thereby speeding up first time execution of managed apps. FIG. 16 may begin at step 1602, where a mobile device is monitored for new applications. For example, device manager 524 may monitor an enrolled mobile device, such as mobile device 502, as described above. The device manager may monitor the installed applications on the mobile device. In an embodiment, the device manager may periodically monitor the mobile device for the installation of new applications.

The process of FIG. 16 may proceed from step 1602 to step 1604, where it is detected that an application capable of running in a managed mode and an unmanaged mode is installed on the mobile device. For example, device manager 524 may monitor an enrolled mobile device and determine that an application capable of running in a managed mode and an unmanaged mode is installed on the mobile device. The device manager may detect that the installed application is capable of running in a managed mode and an unmanaged mode based on meta-data associated with the application or based on any other suitable detection manner.

The process of FIG. 16 may proceed from step 1604 to step 1606, where a resource is provisioned to communicate with the detected application. For example, a resource, such as a gateway server (e.g., gateway server 560) may be provisioned to communicate with the detected application when the application is running in managed mode.

In an embodiment, the resource may comprise a cloud storage resource. The cloud storage resource may store secure data, such as enterprise data. In this example, the cloud storage resource may be provisioned to communicate with the detected application running in managed mode such that the detected application running in managed mode may access the secure data stored in the cloud storage resource after provisioning.

In an embodiment, provisioning the resource may comprise creating an account for the application. In such an embodiment, the process of FIG. 16 may proceed from step 1604 to step 1606, where an account is created for the application that is associated with identification information from the mobile device. For example, an enrolled mobile device may have identification information associated with the mobile device and/or associated with a user of the mobile device. In an embodiment, the identification information may comprise an enterprise credential, such as a login and password for an active directory for an enterprise. In another embodiment, the identification information may comprise a token associated with an enterprise. For example, an enrolled mobile device may receive a token, such as a Security Assertion Markup Language (SAML) token or any other suitable token, from an enterprise server that identifies the enrolled mobile device and/or a user for the enrolled mobile device. The identification information may comprise any other suitable identification information. The device manager (e.g., device manager 524) may access the identification on the mobile device, such as a token, or the mobile device may provide the identification information.

In an embodiment, an account may be created for the application capable of executing in managed mode and unmanaged mode that is associated with the identification information. In this example, the identification information may comprise user credentials, for example enterprise credentials, a token, or any other suitable identification information. In an embodiment, an account may be created based on a determination that an account associated with the identification information does not already exist for the application. For example, a server may search for an account for the application based on the identification information and an account may be created based on the server failing to find an account.

In an embodiment, the created account may be associated with the resource being configured to communicate with the application running in managed mode. For example, a created account may be associated with a cloud storage resource being configured to communicate with the application running in managed mode may.

The process of FIG. 16 may proceed from step 1606 to step 1608, where an account may be identified based on the identification information. For example, an account for a user, such as a user associated with an enterprise, may be identified based on the identification information, such as credentials for the user. The identified account may comprise an enterprise active directory account, an account affiliated with enterprise resource rights, or any other suitable enterprise account. In an embodiment, enterprise resources may be accessed on an enrolled mobile device by signing onto to the identified accounts, as described above.

The process of FIG. 16 may proceed from step 1608 to step 1610, where the created account may be linked with the identified account. For example, an account created for an application capable of running in managed mode and unmanaged mode may be linked with an enterprise account, such as an active directory account. Using the link, the application running in managed mode may be able to access system resources based on access rights for the identified account. For example, where the resource being configured to communicate with the application running in managed mode comprises a cloud storage resource, the application running in managed mode may access secure data in the cloud storage resourced based on the link.

In an embodiment, after an account is created for the application capable of running in managed mode according to FIG. 16, the application may access secure data based on the created account. For example, a user may login to the created account using the application running in managed mode and credentials for the user, such as a login and password or a token. A server, such as gateway server 560, may permit the application running in managed mode to login to the created account based on the provided credentials for the user. The application may request access to enterprise data, such as email for the user or secure documents. The server may permit access to the application based on the linked account. For example, the linked account may comprise an active directory account and/or an account that comprises access rights for the user. The application may be permitted to access enterprise data according to access rights comprises in the linked account.

In an embodiment, the application may comprise a bring your own application and device manager 524 may alter and/or configure the application. For example, the alteration and/or configuration may comprise adjusting the application such that the application may be run in managed mode. For instance, an application may be altered and/or configured such that the data stored by the application while it is running in managed mode is encrypted or is stored in a secure data container. In another example, an application may be altered and/or configured such that the application while it is running in managed mode may communicate with one or more secure resources (e.g., gateway server 560). In this example, the secure resource may comprise a cloud storage resource that has been provisioned to communicate with the application running in managed mode, as described above.

In an embodiment, an application store may provide an application capable of being executed in multiple operations modes. An application store may provide downloadable applications to mobile devices. For example, a mobile device may request a list of downloadable applications, and the application store may provide the requested list. The mobile device may then download one of the listed applications from the application store and install the downloaded application.

In an embodiment, an application store may provide a plurality of versions of an application and may provide a version that is capable of running in multiple operation modes. For example, an application store may provide a version of an application that is capable of running in managed mode or unmanaged mode, as described above.

Figure 17:
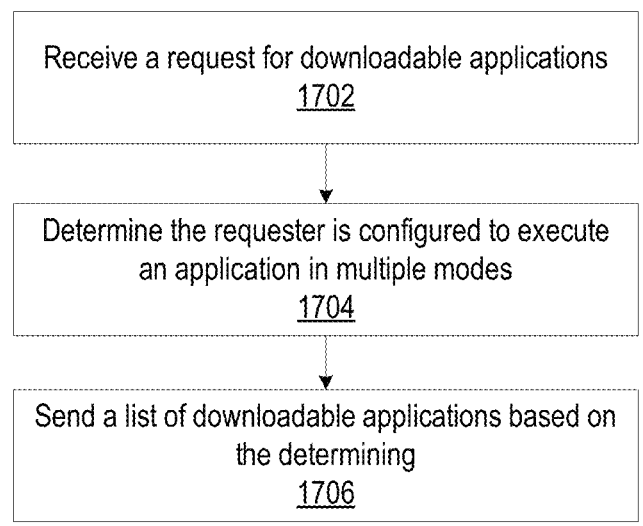
FIG. 17 is a flowchart for an app store in accordance with an illustrative embodiment.

In FIG. 17, a flowchart of example method steps for providing a downloadable application capable of executing in multiple modes is shown according to an embodiment. FIG. 17 may begin at step 1702, where a request is received for downloadable applications. For example, a mobile device, such as mobile device 502, may request a list of downloadable applications from the application store.

The process of FIG. 17 may proceed from step 1702 to step 1704, where it is determined whether the mobile device is configured to execute an application in multiple modes. For example, it may be determined whether the mobile device is configured to execute an application in managed mode and in unmanaged mode.

In an embodiment, it may be determined whether the mobile device is configured with an application management framework capable of executing an application in managed mode and unmanaged mode. It may be determined whether the mobile device is configured with an application management framework such as application management framework 614.

In an embodiment, determining whether the mobile device is configured with an application management framework capable of executing an application in managed mode and unmanaged mode may comprise detecting that a managed application associated with an application management framework is installed on the mobile device. For example, it may be detected whether a managed application, such as client agent 604, that is associated with an application management framework, such as application management framework 614, is installed on the mobile device. Detecting that an application such as client agent 604 is installed on the mobile device may allow a determination that the mobile device is configured with an application management framework capable of executing an application in managed mode and unmanaged mode.

In an embodiment, determining whether the mobile device is configured with an application management framework capable of executing an application in managed mode and unmanaged mode may comprise detecting that the mobile device is managed by a device manager associated with the application management framework. For example, it may be detected whether a device manager, such as device manager 524, that is associated with an application management framework, such as application management framework 614, manages the mobile device. Detecting that a device manager such as device manager 524 manages the mobile device may allow a determination that the mobile device is configured with an application management framework capable of executing an application in managed mode and unmanaged mode.

The process of FIG. 17 may proceed from step 1704 to step 1706, where a list of downloadable applications may be sent to the mobile device based on the determining. For example, when the mobile device is determined to be configured with an application management framework that is capable of executing an application in managed mode and unmanaged mode, a list of downloadable applications may be provided that includes a first version of an application executable in both managed mode and unmanaged mode. In another example, when the mobile device is determined not to be configured with an application management framework that is capable of executing an application in managed mode and unmanaged mode, a list of downloadable applications may be provided that excludes the first version of an application executable in both managed mode and unmanaged mode. For instance, the application may comprise a file sharing application and a first version of the file sharing application may comprise an application that is executable in both managed mode and unmanaged mode, as described above.

In an embodiment, the first version of the application executable in both managed mode and unmanaged mode may be associated with the application management framework on the mobile device, such as application management framework 614. The first version of the application may be selected based on the association with the application management framework implemented by the mobile device. For example, the application store may comprise a plurality of versions of the application executable in managed mode and unmanaged mode, and the first version of the application may be selected for listing because the first version is configured for execution and/or management by the application management framework. By selecting the appropriate version of an application based on the application management framework of a given mobile device, a single application store may provide applications to a wide array of mobile devices regardless of the application management framework implemented by a device. As such, each application management framework provider need not maintain a dedicate application store and application developers can simply supply one or more versions of an application to a single application store for distribution.

In an embodiment, the first version of the application executable in both unmanaged mode and managed mode may be associated with a device manager that manages the mobile device, such as device manager 524. The first version of the application may be selected based on the association with the device manager. For example, the application store may comprise a plurality of versions of the application executable in managed mode and unmanaged mode, and the first version of the application may be selected for listing based on an association with the device manager that manages the mobile device.

In an embodiment, based on the list of downloadable applications, the mobile device may download and install an application. For example, in an embodiment where the list comprises a version of an application executable in managed mode and unmanaged mode, the mobile may download the version of the application and install the version of the application. The mobile device may then execute the installed application in managed mode or in unmanaged mode.

In another embodiment, an application installed on an enrolled mobile device may comprise an external application. For example, an enrolled mobile device may receive an application from an external source unaffiliated with a device manager for the mobile device (e.g., device manger 524), such as a general application store, rather than an enterprise source affiliated with a device manager for the enrolled mobile device (e.g. device manager 524), such as an enterprise application store. In an embodiment, the external application may comprise a general application that is not associated with an enterprise application store.

In an embodiment, the external application may request to sign on to an enterprise account and/or an enterprise server.

An enterprise account may comprise an account associated with an enterprise, such as an account associated with an active directory for an enterprise. For example, the external application may comprise an email client, and the email client may request to sign on to an enterprise email account. In another example, the external application may comprise a cloud storage application, and the cloud storage application may request to sign on to a server that allows access to enterprise resources, such as a gateway server.

In an embodiment, an enrolled mobile device, such as enrolled mobile device 502 of FIG. 5, may have an external application installed, and the external application may submit a request to a server, such as gateway server 560 of FIG. 5, to access an enterprise account. This may comprise an example of a bring your own application (BYOA) embodiment.

In an embodiment, a bring your own application installed on a managed mobile device may be altered and/or configured by a device manager managing the mobile device. For example, a bring your own application installed on mobile device 502 may be altered by device manager 524. The alteration and/or configuration may comprise adjusting the application such that the application may be run in managed mode. For instance, an application may be altered and/or configured such that the data stored by the application while it is running in managed mode is encrypted or is stored in a secure data container. In another example, an application may be altered and/or configured such that the application while it is running in managed mode may communicate with one or more secure resources (e.g., gateway server 560).

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims, and other embodiments may be practiced. For example, various other embodiments include, but are not limited to, the following.

One embodiment may include a method comprising: running, on a mobile device, an application in a first mode, wherein the first mode is a managed mode; running, on the mobile device, the application in a second mode, wherein the second mode is an unmanaged mode, wherein said application is running in the second mode at a mutually exclusive time from when said application is running in the first mode; receiving a request to store data associated with the application; storing the data according to a first protocol when the application is running in the managed mode and storing the data according to a second protocol when the application is running in the unmanaged mode. In such an embodiment, the first protocol may comprise storing data in a first data container and the second protocol may comprise storing data in a second data container mutually exclusive from the first data container. Such an embodiment may further comprise restricting the application from accessing the first data container when running in the unmanaged mode. Such an embodiment may further include the first protocol comprising encrypting data with a first key prior to storing that data and the second protocol comprising at least one of encrypting data with a second key prior to storing the data and storing data unencrypted. In some cases, the application running in the managed mode is managed by a device manager in accordance with one or more policy files separate from the application and applicable to a plurality of applications. Some aspects may also include receiving a signal from the device manager to disable the managed mode of the application. When that happens, the embodiment may locate, in response to the received signal, data stored according to the first protocol, and selectively delete the located data. Locating the data stored according to the first protocol may include determining a managed account associated with the application, and locating the data based on the managed account. In some cases, locating data stored according to the first protocol further comprises locating a container that stores data according to the first protocol. In some aspects, locating data stored according to the first protocol further comprises determining an encryption key associated with the first protocol; and locating the data based on the determined encryption key. In some embodiment, the device manager disables the managed mode in response to identifying a black listed application installed on the mobile device. The device manager may disable the managed mode in response to detecting that a managed account associated with the application has expired. The device manager may disable the managed mode in response to detecting that the mobile device has been jailbroken or rooted. In some cases, selectively deleting the located data does not delete personal data associated with the application stored on the mobile device.

Another embodiment may include a computing device comprising a processor, wherein the computing device is configured to run an application in a first mode, wherein the first mode is a managed mode operating under the control of one or more policy files separate from the application and usable to manage operations of multiple applications executing on the computing device; run the application in a second mode, wherein said application is running in the second mode at a mutually exclusive time from when said application is running in the first mode; receive a request to store data associated with the application; and store the data according to a first protocol when the application is running in the first mode and store the data according to a second protocol when the application is running in the second mode. In some aspect the first protocol comprises storing data in a first data container and the second protocol comprises storing data in a second data container different from the first data container. In some embodiments the computing device is further configured to restrict the application from accessing the first data container when running in the second mode. In some embodiments the first protocol comprises encrypting data with a first key prior to storing that data and the second protocol comprises at least one of encrypting data with a second key prior to storing the data and storing data unencrypted. In some embodiments the first mode is a first managed mode, and the second mode is a second managed mode managed in accordance with at least one different policy file than the first managed mode.

Yet another embodiment may include one or more non-transitory computer-readable storage media storing computer-executable instructions that, when executed by one or more processors of a data processing system, cause the system to: run an application in a first mode, wherein the first mode is a managed mode; run the application in a second mode, wherein the second mode is an unmanaged mode, wherein said application is running in the second mode at a mutually exclusive time from when said application is running in the first mode; receive a request to store data associated with the application; store the data according to a first protocol when the application is running in the managed mode and store the data according to a second protocol when the application is running in the unmanaged mode.

In another illustrative embodiment, a method may include periodically monitoring a mobile device to determine that a new software application is installed on the mobile device; detecting that the application is capable of running in both a first mode and a second mode, wherein the first mode is a managed mode operating under the control of one or more policy files separate from the application and usable to manage operations of multiple applications executing on the computing device; provisioning a resource to communicate with the application such that the resource is configured only to communicate with the application when the application is running in the first mode, and not to communicate with the application when the application is running in the second mode. In some aspects the resource comprises a cloud storage resource that stores secure data. In some aspects provisioning the resource comprises provisioning the cloud data storage resource to allow the application to access secure data stored in the cloud data storage resource while the application is running in the first mode. In some aspects the mobile device is managed by a device manager, and wherein the device manager administers the one or more policy files. In some aspects provisioning the resource further comprises creating an account with the resource for the application associated with identification information from the mobile device; locating a managed account based on the identification information; and linking the managed account to the created account. In some aspects the second mode is a second managed mode operating under the control of one or more policy files different from the first mode. In some aspects the first mode is associated with a first user role, and the second mode is associated with a second user role different from the first user role. In some aspects the first mode is associated with a first workplace environment type, and the second mode is associated with a second workplace environment type. In some aspects the method includes detecting that the application is running in the first mode; and allowing the application to access secure data based on the created account. In some aspects the method includes receiving a request from the application running in the first mode, wherein the request comprises a request to access secure data; and granting the application access to the secure data based on the created account. In some aspects the application is distributed by an enterprise to the device.

In another illustrative embodiment, a device with a processor is configured to: periodically monitor a mobile device to determine that a new software application is installed on the mobile device; detect that the application is capable of running in both a first mode and a second mode, wherein the first mode is a managed mode operating under the control of one or more policy files separate from the application and usable to manage operations of multiple applications executing on the computing device; provision a resource to communicate with the application such that the resource is configured only to communicate with the application when the application is running in the first mode, and not to communicate with the application when the application is running in the second mode. In some aspects, the resource comprises a cloud storage resource that stores secure data. In some aspects provisioning the resource comprises provisioning the cloud data storage resource to allow the application to access secure data stored in the cloud data storage resource while the application is running in the first mode. In some aspects the mobile device is managed by a device manager, wherein the device manager administers the one or more policy files. In some aspects provisioning the resource further comprises: creating an account with the resource for the application associated with identification information from the mobile device; locating a managed account based on the identification information; and linking the managed account to the created account. In some aspects the second mode is a second managed mode operating under the control of one or more policy files different from the first mode. In some aspects the first mode is associated with a first user role, and the second mode is associated with a second user role. In some aspects the device further is configured to: detect that the application is running in the first mode; and allow the application to access secure data based on the created account.

In another illustrative embodiment, one or more non-transitory computer-readable storage media store computer-executable instructions that, when executed by one or more processors of a data processing system, cause the system to perform: periodically monitoring a mobile device to determine that a new software application is installed on the mobile device; detecting that the application is capable of running in both a first mode and a second mode, wherein the first mode is a managed mode operating under the control of one or more policy files separate from the application and usable to manage operations of multiple applications executing on the computing device; and provisioning a resource to communicate with the application such that the resource is configured only to communicate with the application when the application is running in the first mode, and not to communicate with the application when the application is running in the second mode.

The invention claimed is:

1. A method comprising:
providing, by a mobile device, an application, the application including a first mode and a second mode, the first mode and the second mode being a managed mode managed by a device manager in accordance with one or more policy files separate from the application and applicable to a plurality of applications, and
the second mode being executable at a mutually exclusive time of the first mode;
creating, by the mobile device, an account associated with a user of the application;
linking, by the mobile device, the account to a first managed account with the application in the first mode;
linking, by the mobile device, the account to a second managed account with the application in the second mode, wherein the first managed account has access to data stored according to a first protocol, and the second managed account has access to data stored according to a second protocol;
receiving, by the mobile device, a request to store data associated with the application; and
storing, by the mobile device, the data with the application in the first mode according to the first protocol and with the application in the second mode according to the second protocol.

2. The method of claim 1, wherein the first protocol comprises storing data in a first data container and the second protocol comprises storing data in a second data container mutually exclusive from the first data container.

3. The method of claim 2, further comprising restricting the application from accessing the first data container when running in the second mode.

4. The method of claim 1, further comprising locating data according to the first protocol by locating data stored according to the first protocol comprises:
determining a managed account associated with the application; and
locating the data based on the managed account.

5. The method of claim 1, further comprising locating data according to the first protocol by locating data stored according to the first protocol and locating a container that stores data according to the first protocol.

6. The method of claim 1, further comprising locating the data stored according to the first protocol by:
encrypting the data with a first key prior to storage of the data according to the first protocol;
determining the first key associated with the first protocol; and
locating the data based on the determined first key.

7. The method of claim 1, further comprising: disabling the first mode in response to identifying a black listed application installed on the mobile device.

8. The method of claim 1, further comprising: disabling the first mode in response to detecting that a managed account associated with the application has expired.

9. The method of claim 1, further comprising: disabling the first mode in response to detecting that the mobile device has been jailbroken or rooted.

10. A method of claim 1, further comprising:
selectively deleting the data stored on the mobile device associated with the first protocol upon receiving a signal to disable the first mode of the application.

11. A computing device comprising:
a processor, wherein the computing device is configured to:
provide an application in a first mode and a second mode, the first mode and the second mode being a managed mode managed by a device manager in accordance with one or more policy files separate from the application and usable to manage operations of multiple applications executing on the computing device, and
the second mode being executable at a mutually exclusive time of the first mode;
create an account associated with a user of the application;
link the account to a first managed account with the application in the first mode;
link the account to a second managed account with the application in the second mode, wherein the first managed account has access to data stored according to a first protocol, and the second managed account has access to data stored according to a second protocol;
receive a request to store data associated with the application; and
store the data with the application in the first mode according to the first protocol and with the application in the second mode according to the second protocol.

12. The computing device of claim 11, wherein the first protocol comprises storing data in a first data container and the second protocol comprises storing data in a second data container different from the first data container.

13. The computing device of claim 11, wherein the computing device is further configured to:
restrict the application from accessing the first data container when running in the second mode.

14. The computing device of claim 11, wherein the first mode is a first managed mode, and the second mode is a second managed mode managed in accordance with at least one different policy file than the first managed mode.

15. The computing device of claim 11, wherein the computing device is further configured to:
determine a managed account associated with the application; and
locate the data based on the managed account.

16. The computing device of claim 11, wherein the computing device is further configured to locate data stored according to the first protocol by locating a container that stores data according to the first protocol.

17. The computing device of claim 11, wherein the computing device is further configured to locate the data stored according to the first protocol by:
encrypting the data with a first key prior to storage of the data according to the first protocol;
determining the first key associated with the first protocol; and
locating the data based on the determined first key.

18. One or more non-transitory computer-readable storage media storing computer-executable instructions that, when executed by one or more processors of a data processing system, configure the system to:
provide an application in a first mode and a second mode, the first mode and the second mode being managed mode managed by a device manager in accordance with one or more policy files separate from the application and usable to manage operations of a plurality of applications, and the second mode being executable at a mutually exclusive time of the first mode;
create an account associated with a user of the application;
link the account to a first managed account with the application in the first mode;
link the account to a second managed account with the application in the second mode, wherein the first managed account has access to data stored according to a first protocol, and the second managed account has access to data stored according to a second protocol;
receive a request to store data associated with the application; and
store the data with the application in the first mode according to the first protocol and with the application in the second mode according to the second protocol.

* * * * *